United States Patent
Hamano et al.

(10) Patent No.: US 7,454,215 B2
(45) Date of Patent: Nov. 18, 2008

(54) COMMUNICATION METHOD, COMMUNICATION APPARATUS AND COMMUNICATION SYSTEM

(75) Inventors: Yuichiro Hamano, Kawasaki (JP); Mamoru Higuchi, Kawasaki (JP); Yukihiro Noda, Kawasaki (JP); Ritsuo Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 10/996,247

(22) Filed: Nov. 23, 2004

(65) Prior Publication Data

US 2005/0090262 A1 Apr. 28, 2005

Related U.S. Application Data

(63) Continuation of application No. PCT/JP02/08841, filed on Aug. 30, 2002.

(51) Int. Cl.
*H04Q 7/20* (2006.01)
(52) U.S. Cl. .................... 455/455; 455/432.1; 455/433; 455/435.2
(58) Field of Classification Search ........... 455/428, 455/422.1, 452.2, 432.1, 433, 435.1, 437, 455/439, 445; 370/328, 232
See application file for complete search history.

(56) References Cited

U.S. PATENT DOCUMENTS

| | | | | |
|---|---|---|---|---|
| 5,497,507 | A | * | 3/1996 | Komaki ................ 455/552.1 |
| 5,794,137 | A | | 8/1998 | Harte |
| 6,119,003 | A | * | 9/2000 | Kukkohovi .............. 455/435.2 |
| 6,122,263 | A | | 9/2000 | Dahlin et al. |
| 2002/0082017 | A1 | * | 6/2002 | Hattori ................... 455/436 |
| 2002/0147008 | A1 | * | 10/2002 | Kallio .................. 455/426 |
| 2005/0239443 | A1 | * | 10/2005 | Watanabe et al. ....... 455/414.1 |
| 2006/0133307 | A1 | * | 6/2006 | Fukasawa et al. .......... 370/328 |

FOREIGN PATENT DOCUMENTS

| | | |
|---|---|---|
| CN | 1195433 | 10/1998 |
| EP | 1 207 656 | 5/2002 |
| JP | 11-298631 | 10/1999 |
| JP | 2000-106605 | 4/2000 |
| JP | 2002-503419 | 1/2002 |
| JP | 2002-077268 | 3/2002 |
| JP | 2002-077271 | 3/2002 |
| JP | 2002-209276 | 7/2002 |
| WO | WO 98/57482 | 12/1998 |

OTHER PUBLICATIONS

International Search Report dated Dec. 17, 2002.
The First Office Action dated Feb. 9, 2007, from the corresponding Chinese Application.

* cited by examiner

*Primary Examiner*—Duc M. Nguyen
*Assistant Examiner*—Dai Phuong
(74) *Attorney, Agent, or Firm*—Katten Muchin Rosenman LLP

(57) ABSTRACT

A communication method enabling communication on a predetermined mobile communication network and communication on a predetermined wireless communication network different from the predetermined mobile communication network, includes the step of: switching, means for carrying out predetermined data transfer while maintaining a communication channel on the predetermined mobile communication network, between communication on the predetermined mobile communication network and communication on the predetermined wireless communication network, or activating or deactivating a part concerning the predetermined wireless communication included in a mobile terminal.

26 Claims, 14 Drawing Sheets

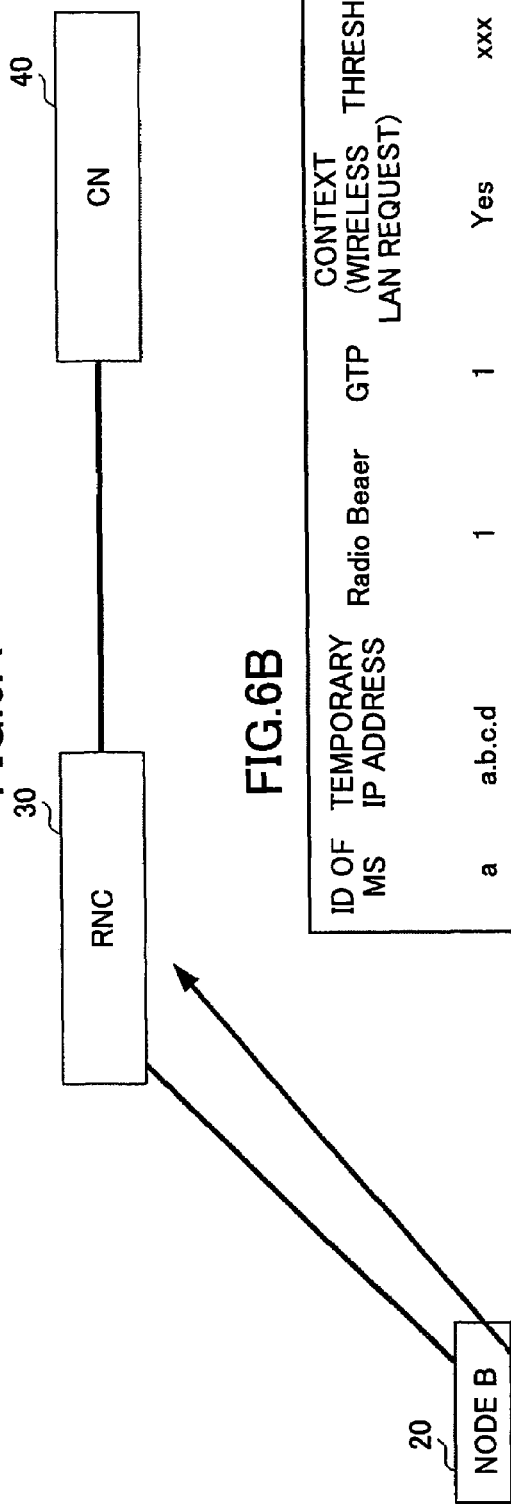
FIG.6A
FIG.6B
| ID OF MS | TEMPORARY IP ADDRESS | Radio Bearer | GTP | CONTEXT (WIRELESS LAN REQUEST) | THRESHOLD |
|---|---|---|---|---|---|
| a | a.b.c.d | 1 | 1 | Yes | xxx |
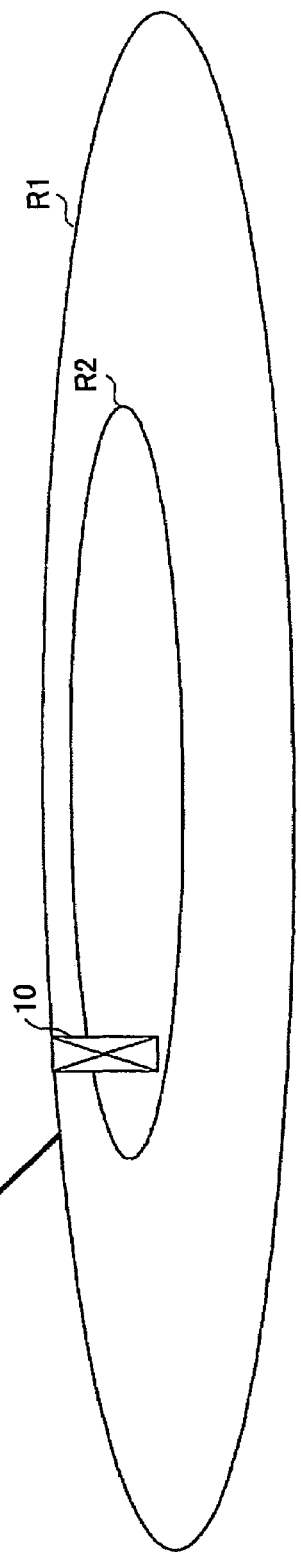

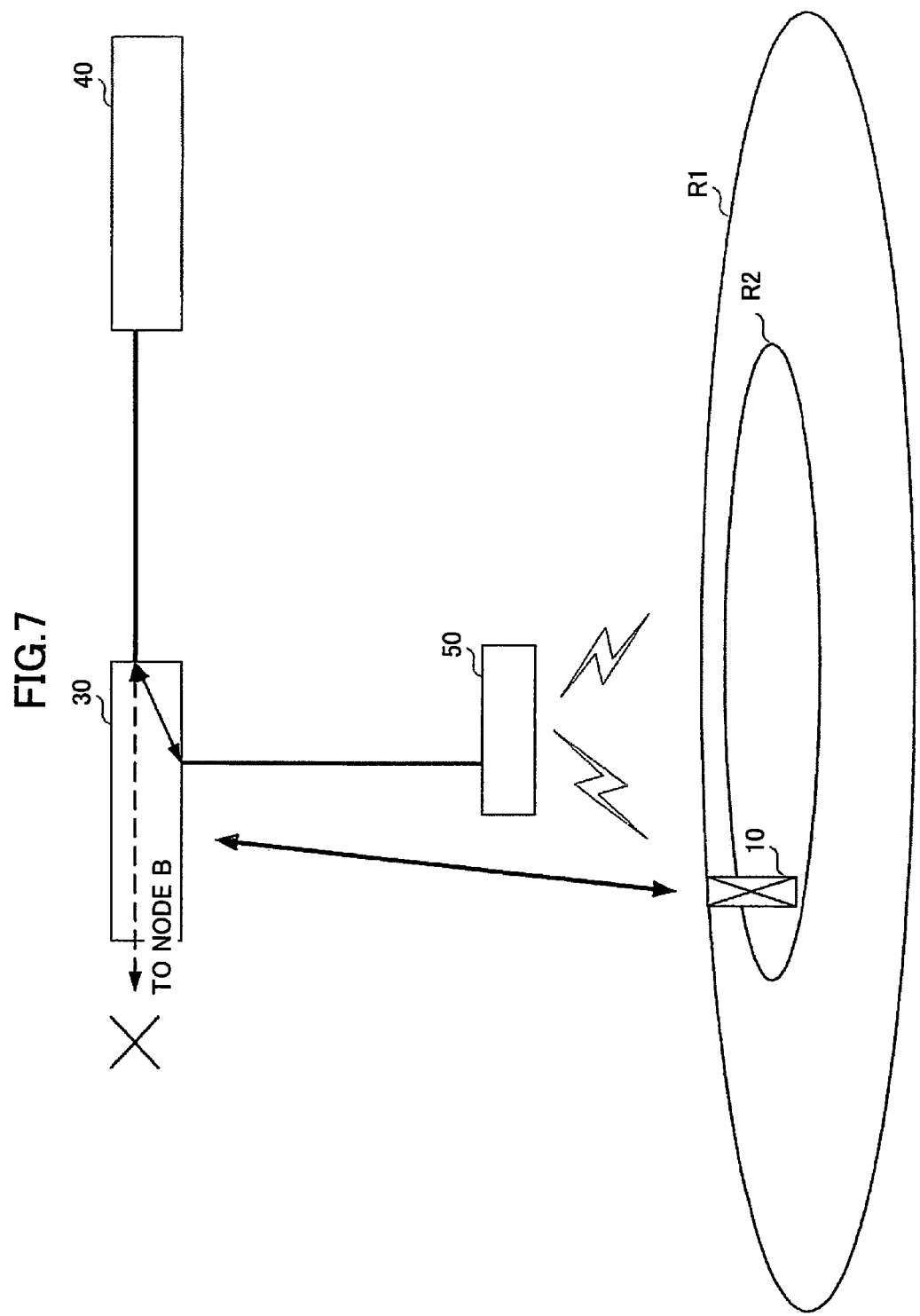

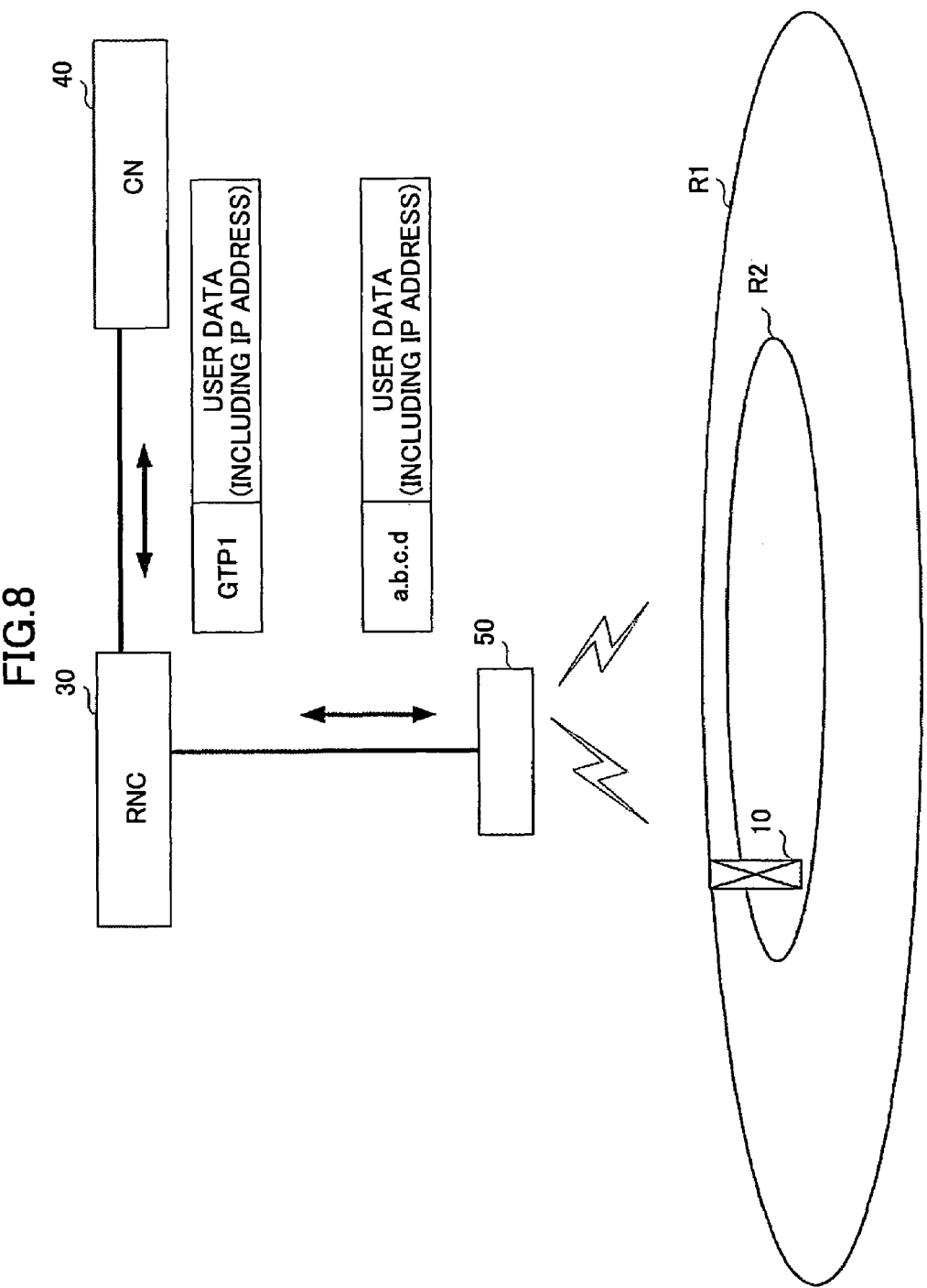

COMMUNICATION METHOD, COMMUNICATION APPARATUS AND COMMUNICATION SYSTEM

CROSS-REFERENCE TO RELATED APPLICATION

This application is a U.S. continuation application filed under 35 USC 111(a) claiming benefit under 35 USC 120 and 365(c) of PCT application JP02/08841, filed on Aug. 30, 2002.

TECHNICAL FIELD

The present invention relates to a communication method, a communication apparatus and a communication system, and in particular, to a communication method, a communication apparatus and a communication system which can provide a system enabling high rate transfer of a large amount of user data arising in a spot manner without affecting normal communication.

BACKGROUND ART

In a field of mobile communication, along with spread of cellular phone terminals, a traffic concerning cellular phones tends to increase. Especially, increase in traffic occurs as a result of accessing to or downloading from Web sites, due to improvement of service contents by provided operators, in particular, improvement of Web-based contents, or such. On the other hand, resources required therefor are limited, and as a result, communication of another cellular phone existing within a same base station area may be affected by execution of transmission/reception of a large amount of user data for a cellular phone.

Conventionally, in such a mobile communication system, for a cellular phone which exists in an area covered by a base station, data transfer may be carried out by communication via the base station as well as another base station adjacent thereto. Further, within an area covered by a common base station, a common radio resource is used both for transmitting an ordinary speech signal and for transmitting other user data such as Web contents. Thereby, in a case where many cellular phones exist within the area covered by the common base station, when one terminal thereof carries out high rate data transfer processing such as downloading of Web contents, another terminal may not carry out communication until the high rate data transfer processing ends.

DISCLOSURE OF THE INVENTION

The present invention has been devised in consideration of the above-mentioned situation, and, an object of the present invention is to provide an environment enabling communication of a large amount of user data at a high rate without affecting other communication within a base station area. In other words, an object of the present invention is to incorporate a high rate communication function which is carried out independently from mobile communication into a IP communication network with mobility in a seamless manner and thereby high rate communication in a spot manner is made possible in the mobile communication network without changing an existing framework of mobile communication technology.

The present invention relates to an art of providing an area in which wireless LAN or such can be applied which enables extremely high rate communication with respect to communication on a conventional mobile communication network channel within an area covered by a base station; signal information such as a usage request therefor is transmitted to a base station control apparatus with the use of the conventional mobile communication channel; and thereby, separation is carried out between a channel used for transmitting a normal speech signal and a channel used for transmitting other high rate user data transfer; and as a result, high rate communication of a large amount of user data in a spot manner is made possible without affecting normal signal communication.

Specifically, a communication method according to the present invention enabling communication on a predetermined mobile communication network with cellular phones and communication on another predetermined wireless communication network, includes steps of: obtaining, by a mobile terminal, a predetermined address for a communication service when the mobile terminal becomes able to receive the communication service via the predetermined wireless communication network; notifying, of the obtained address, control means which controls communication on the mobile communication network with the use of a signal transfer function on the predetermined mobile communication network; and establishing a session used for carrying out predetermined data transfer between the mobile terminal and the control means with the use of the predetermined wireless communication network, in response to the notification of the address.

By employing such a configuration, it is possible to establish an environment in which, in a relatively simple manner using functions of an existing mobile communication network as they are, a communication service via another different wireless communication network such as a wireless LAN can be carried out in a spot manner. Accordingly, even with a relatively simple configuration, high rate large size transferring wireless communication service can be carried out as is necessary without affecting transmission of ordinary speech signals, small size data communication or such, within existing mobile communication network service operation.

Furthermore, according to the present invention, a new problem which may arise in the above-mentioned system in which high rate large size data transferring wireless communication service is introduced within operation of existing mobile communication network service is considered, which problem is one concerning battery power consumption in a cellular mobile terminal device for receiving the different two types of wireless communication services. For the purpose of solving this problem, switching between communication with the use of the above-mentioned existing mobile communication network for the purpose of carrying out predetermined data transfer and other communication with the use of another predetermined wireless communication network is carried out appropriately, while a part of the cellular mobile terminal concerning communication with the use of the other predetermined wireless communication network is deactivated appropriately.

As a result, the part of the cellular mobile terminal device concerning the high rate large size data transferring wireless communication service, which is in particular expected to consume large power consumption is deactivated, that is, power supply to this part is stopped, appropriately. Thereby, it is possible to effectively reduce power consumption in the cellular mobile terminal device. Accordingly, it is possible to achieve a configuration in which a standby time duration can be kept, while a high rate large size data transferring service which may arise in a spot manner can be handled.

BRIEF DESCRIPTION OF DRAWINGS

FIG. 6A illustrates a flow of communication information from the MS to the RNC in the sequence shown in FIG. 2.

FIG. 6B illustrates "mobile terminal information correspondence table" created and held by the RNC from information obtained through communication operation shown in FIG. 6A.

FIG. 7 illustrates channel switching in a path unit with reference to the "mobile terminal information correspondence table" in the sequence shown in FIG. 2.

FIG. 8 illustrates a packet format at a time of user data transfer through the wireless LAN channel in the sequence shown in FIG. 2.

BEST MODE FOR CARRYING OUT THE PRESENT INVENTION

Embodiments of the present invention are described below in details.

Figure 1:
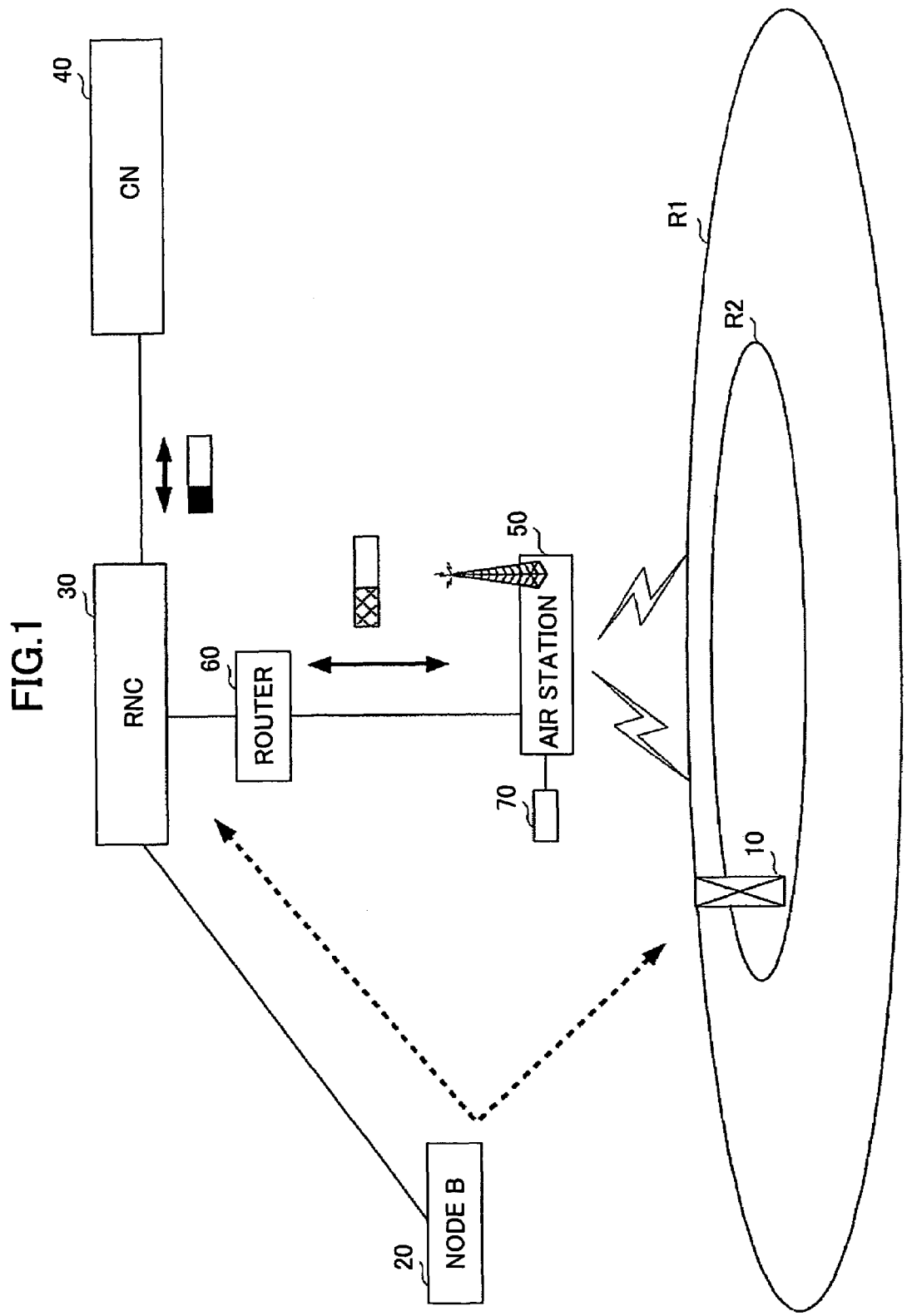
FIG. 1 is a diagram (#1) showing a system configuration example applicable to each embodiment of the present invention.

The embodiments belong to a mobile communication system of 3GPP which is a project group involved for creating a specification of a so-called third generation mobile communication system 'IMT2000', and have a configuration shown in FIG. 1, for example.

The mobile communication system generally includes a radio access network (UTRAN) and a core network apparatus (CN) 40 which controls position control, call control and service control, and the radio access network UTRAN includes a base station control apparatus (RNC) 30 and a node B 20 acting as a radio base station.

The core network apparatus 40 and the base station control apparatus 30 are connected by a so-called Iu (interconnection point) interface, and the base station control apparatus 30 carries out management of radio resources, control of the respective nodes B 20, and so forth. Each node B 20 covers one or a plurality of cells, and covers a region of an area R1 in an example of FIG. 1.

On the other hand, the base station control apparatus 30 is connected to an air station 50 used for providing a spot manner communication service with the use of predetermined wireless LAN via a router 60 via a communication network such as an Ethernet (registered trademark). The air station 50 has a DHCP (dynamic host configuration protocol) server 70, and has a DHCP function for providing an IP address automatically to a terminal 10 belonging thereto. An area covered by annunciation radio waves of the air station 50 is a region R2 in the example of FIG. 1.

Each mobile terminal 10 possessed by a user is, for example, a cellular phone, is connected to a predetermined wireless communication channel with the node B 20 when the mobile terminal exists within the area R1 covered by the node B 20, while it is connected similarly with a predetermined wireless communication channel via the air station 50 when the mobile terminal exists within the area R2 covered by the air station 50 of wireless LAN. There, the mobile terminal carries out ordinary speech communication or packet communication with a small transmission data amount in communication via the node B 20, while it carries out high rate large size packet communication with a relatively large transmission data amount in communication via the air station 50 of wireless LAN.

Communication control operation carried out in the present configuration is roughly described below.

That is, the mobile terminal 10 requests the DHCP server 70 which provides an IP address when receiving radio waves from the side of the wireless LAN. Then, the terminal 10 transmits the IP address thus obtained from the side of the wireless LAN, to the radio base station 30 after attaching the IP address to a "receiving radio wave condition report (Measurement Report)" signal as new reporting information called a temporary IP address parameter. Further, a user of this terminal 10 may incorporate a "wireless LAN request parameter" into context information through operation made on the terminal when communication is started up.

On the other hand, the core side apparatus 40 which receives active PDP context request signal information notifies the relevant base station control apparatus 30 of the above-mentioned "wireless LAN request parameter" included therein as a new information element of a RAB assignment request signal. The base station control apparatus 30 stores 'terminal identifier—temporary IP address—communication path context information' in a predetermined "mobile terminal information correspondence table", and refers to a relevant position of the table in response to receiving the "receiving radio wave condition report (Measurement Report)" from the terminal 10 as a trigger.

The base station control apparatus 30 determines whether or not a communication channel should be switched based on a result of the referring to the "mobile terminal information correspondence table". Then, when the channel is switched to that using wireless LAN, user data is converted into a form of IP over IP, includes the IP address obtained in the wireless LAN environment in an outer header, and sends it out.

Further, the base station control apparatus 30 sends an IP address of its own to the terminal 10 in a form of new information including it in a "measurement stop instruction (Measurement completion)".

By such processing, the terminal 10 obtains the new IP address in the environment in which wireless LAN is available from the DHCP server 70, notifies the same to the base station control apparatus 30, which then uses this IP address as a destination address and carries out communication with the terminal 10 via a new radio channel which is a wireless LAN channel.

Further, the terminal 10 attaches the IP address obtained in the wireless LAN environment as new parameter information of the "receiving radio wave condition report (Measurement Report)", and it can send this information to the base station control apparatus 30 with the use of the existing signal.

Further, by means of designating a "wireless LAN request parameter" through terminal's operation at a time of communication starting up, a terminal's user can determine whether the user wishes to use the wireless LAN channel, for each unit of communication contents. Further, by attaching this parameter as new context information, it is possible to transmit this information to the side of the network with the use of the existing signal (active PDP context request).

The core side apparatus 40 which receives this active PDP context request signal then attaches the "wireless LAN request parameter" included therein as a new information element of the existing signal (RAB assignment request), and sends the same to the base station control apparatus 30. As a result, the request of the subscriber input from the terminal 10 is stored in the base station control apparatus 30 as context information.

Then, the base station control apparatus 30 has the "mobile terminal information correspondence table", collectively manages all the information concerning a data path established with the terminal 10 therein, and thus, the base station control apparatus 30 itself can determine whether or not channel switching is needed. Further, reception of the "receiving radio wave condition report (Measurement Report)" signal is used as a trigger for referring to this correspondence table. As a result, it is possible to start up operation of distributing data to an appropriate channel at an appropriate timing.

Further, as the IP address obtained in the wireless LAN environment by the terminal 10 is transmitted therefrom as header information outside of a packet encapsulated in an IP-over-IP form, this is used for applying the wireless LAN as a communication channel, and a session between the base station control apparatus 30 and the terminal 10 can be established.

Thus, the wireless LAN environment available to the terminal 10 is notified of, to the base station control apparatus 30 which exists in the IP communication network with mobility, and thereby it is possible to make a determination for changing a data path of user data provided via a predetermined path to be then transferred via a wireless LAN channel. As a result, it is possible to change a user data communication channel between the base station control apparatus 30 and the terminal 10, into a wireless LAN channel, as is necessary. Accordingly, it is possible to incorporate a high rate communication function of wireless LAN originally carried out independently from mobile communication, into a IP communication network with mobility in a seamless manner, and to provide a spot manner high rate communication service in the framework of a mobile communication network service.

In the above-mentioned configuration, the accessing function which is an original function of the mobile communication network normally is utilized, and, thereby, it becomes possible to automatically switch into data communication via wireless LAN when a user moves to the area S2 in which wireless LAN is available. In this case, the user who wishes to use data communication on wireless LAN may always activate a wireless LAN device mounted in the mobile terminal 10 regardless of whether or not it exists within the wireless LAN service providing area S2.

In this case, the wireless LAN device receives all the radio frames transmitted from the air station of wireless LAN regardless of whether or not they are addressed to it, as long as it exists within the above-mentioned area S2. Then, at each time, it examines each of the received frames for a destination MAC address thereof. Accordingly, a power consumption amount in the mobile terminal 10 may increase.

Further, when the user exists within the wireless LAN service providing area S2 and carries out data transmission/reception, data transmission/reception may be carried out always with the use of the communication system on wireless LAN even if a data amount is relatively small so that a circuit capacity prepared by the communication system on wireless LAN may be surplus while a circuit capacity of the accessing means of the original mobile communication network may be sufficient. In this case, since power consumption of the wireless LAN device is larger than that for a case of communication operation on the original mobile communication network, the power may be uselessly consumed in the mobile terminal 10.

On the other hand, since the mobile terminal 10 used in communication on the mobile communication network operates with a battery mounted therein, increase in the power consumption results in reduction of a stand-by duration, whereby usage inconvenience may arise. Therefore, in the above-mentioned 3GPP, mobile terminals are grouped into some receiving groups, and, a notification of signal reception is sent to a specific receiving group with the use of a PICH (page indication channel: a type of physical channel). Mobile terminals which receive the notification of signal reception on the PICH receive a PCH (paging channel: a type of transport channel) mapped to a S-CCPCH (secondary common control physical channel: a type of physical channel). At this time, the mobile terminals in stand-by modes receive only a PI (paging indicator) addressed to the receiving group to which they belong, and receive the S-CCPCH/PCH only when receiving the notification of signal reception. Accordingly, power consumption at a time of signal reception is effectively reduced, and as a result, power consumption in the mobile terminal is reduced. Details of the system are disclosed by, for example, 'W-CDMA mobile communication system', under editorship of Keiji Tachikawa, published by Maruzen Co., Ltd., the fourth edition, pages 222-223, ' (ii) intermittent receiving control' or such. There, an electric current is consumed during on the order of 10 ms for each radio frame of the above-mentioned PICH.

On the other hand, in a communication system of wireless LAN, between an access point and a transmission/reception terminal belonging thereto, all radio waves are transmitted/received via a single channel. Then, for the purpose of avoiding radio wave competition (frame collision), a scheme of CSMA/CA+ACK (carrier sense multiple access with collision avoidance with acknowledgement), RTS/CTS (request to send/clear to send) or such is applied. In the CSMA/CA+ACK scheme, there is a case where a transmission side transmits radio waves to a receiving side without advance notice. Further, in the above-mentioned RTS/CTS scheme, data transmission is carried out after a transmission side carries out RTS (transmission advance notification) and receives CTS (reception acceptance), where the RTS or CTS is received by all the terminals. Accordingly, in either scheme, the transmission/reception terminals should always be in a condition in which they can receive radio waves, and therefore, power consumption amounts increase in the terminals. The above-mentioned technology of radio wave competition is disclosed by, for example, 'Nikkei NETWORK, September, 2000', pages 66-67, 'How radio wave competition is avoided?', or such.

Thus, a technology of reducing the power consumption in the terminal is applied in a communication system of mobile communication network. However, such a technology has not been established in a wireless LAN communication system yet. Therefore, if a communication system on wireless LAN is incorporated in and is applied to an existing communication system on a mobile communication network as it is, the above-mentioned imbalance in power consumption may result in increase of the power consumption of particular mobile terminal, a stand-by duration available from single battery charge remarkably drops, and thereby, inconvenience may arise.

In the embodiments of the present invention, in consideration of the above-mentioned problems, the power consumption is reduced as a result of carrying selective switching of data communication from a mode using mobile communication accessing means to a mode using wireless LAN, a working duration for which a user uses the mobile terminal with power supply from the battery is increased, and thus, the convenience is improved.

Specifically, as described above, in wireless data communication on wireless LAN, radio frames reach all the radio terminals existing within the radio wave reachable area. The mobile terminal which receives the radio waves then compares destination MAC addresses of all the radio frames with its own MAC address, discards the radio frames having the different addresses as a result of the comparison, and takes only the radio frame addressed thereto. Thus, since it always carries out the reception and the comparison even on the radio frames having the different addresses, the power consumption may remarkably increase in a state of using a wireless LAN service in comparison to the other states. Accordingly, if a manner of always activating the wireless LAN device regardless of whether or not data communication is carried out is applied, the power consumption increases.

In order to solve the problem, in the embodiments of the present invention, the way of always entering the wireless LAN available condition when the mobile terminal moves to the wireless LAN available area is avoided, switching of data communication from a service using the mobile communication accessing means to a service using wireless LAN is carried out selectively, and thereby, the power consumption in each terminal is reduced. As a result, a working duration for which a user uses the mobile terminal with the power supply from the battery is increased, and thus, convenience can be improved.

Specifically, in the embodiments of the present invention, even when the mobile terminal 10 exists within the wireless LAN service available area S2, the wireless LAN device mounted in the mobile terminal 10 is left inactivated, i.e., in a state without the power supply when data transmission/reception is not actually carried out, while a function of determining whether or not data transmission/reception on wireless LAN should be carried out is provided in the user, the mobile terminal itself or in the mobile communication network.

As a criterion of the determination, a data transmission/reception amount, remaining battery power, a mobile communication network/wireless LAN radio link band vacancy situation, or such, or a combination thereof is applied. Then, the user, the mobile terminal or the mobile communication network determines that data transmission/reception on wireless LAN should be carried out, and wireless LAN is activated, i.e., is fed with power only when data transmission/reception on wireless LAN is actually carried out whereby transmission/reception of radio waves and check of received MAC frame destination can be carried out. Then, when the data transmission/reception is finished, the wireless LAN device is again deactivated manually or automatically.

By configuring so, the wireless LAN device is activated only when it is necessary, while it is deactivated when it becomes not necessary. Thereby, it is possible to control the power consumption of the mobile terminal on the minimum necessary level. Thereby, it is possible to increase the battery working duration of the mobile terminal, and thus, it is possible to keep the convenience of the conventional mobile communication system even incorporating the wireless LAN system.

As described above, the communication system according to the embodiments of the present invention includes the mobile terminal 10, the base station control apparatus 30, the radio base station 20, the air station 50 providing wireless LAN service, and the core network apparatus 40. Configuration of each apparatus in a first embodiment of the present invention is described next. In the first embodiment, based on a communication data amount occurring when data is downloaded in the mobile terminal 10, switching between data transfer via UTRAN, i.e., the conventional mobile communication network and data transfer on wireless LAN may be carried out.

First, configuration of the mobile terminal 10 is described. The mobile terminal has an IP communication function via UTRAN and an IP communication function via wireless LAN. Further, the mobile terminal 10 previously has an IP address for the purpose of communication in an end-to-end manner. This IP address is used for IP communication either via UTRAN or via wireless LAN.

Further, the mobile terminal 10 has a function of attaching information that a user wishes data communication on wireless LAN to PDP context information and notifying the base station control apparatus 30 thereof. The information used for this notification is referred to as a "wireless LAN request parameter". Further, the mobile terminal 10 has a function of attaching a "threshold value" used when a communication state is switched from one via UTRAN to one via wireless LAN, to the above-mentioned PDP context information, and notifying the base station control apparatus 30 thereof. However, the above-mentioned threshold value may be fixedly set as a common value among all the mobile terminals 10 belonging to the base station control apparatus 30. In this case, the above-mentioned notification function is not required.

Further, the mobile terminal 10 has a function of responding to an instruction (signal) from the base station control apparatus 30 for turning on/off the power supply to the wireless LAN device mounted therein. The mobile terminal 10 has a function of receiving radio waves from the air station 50 to determine that communication via wireless LAN is available, after turning on the power supply to the wireless LAN device responding to the instruction from the base station control apparatus 30.

Before carrying out communication via wireless LAN, the mobile terminal 10 obtains an IP address via the air station of wireless LAN thanks to the DHCP function provided in the air station 50. This IP address is different from the above-mentioned IP address previously given for the purpose of end-to-end communication, is used for setting a transport layer between the base station control apparatus 30 and the mobile terminal 10, and is referred to as a temporary IP address.

The mobile terminal 10 further has a function of notifying the base station control apparatus 30 of the temporary IP address with the use of the receiving radio wave condition report (Measurement Report) signal conventionally used in UTRAN via the radio base station 20 (via the conventional UTRAN). Further, the mobile terminal 10 has a function of, when the mobile terminal 10 moves to the outside of the wireless LAN service area S2, notifying the base station control apparatus 30 of this situation with the use of the receiving radio wave condition report (Measurement Report) signal in which 'blank' is set in the temporary IP address field. Further, the mobile terminal 10 has a function of, when the power supply to the wireless LAN device mounted in the mobile terminal 10 is turned off, notifying the base station control apparatus 30 of this situation with the use of the receiving radio wave condition report (Measurement Report) signal in which 'blank' is set in the temporary IP address field.

Next, configuration of the base station control apparatus 30 is described. The base station control apparatus 30 has an IP communication function on a UTRAN channel. In other words, the base station control apparatus 30 has a function of recognizing a radio environment under which the mobile terminal 10 can carry out transmission/reception, from the above-mentioned receiving radio wave condition report (Measurement Report) signal. This is a function which the conventional base station control apparatus according to 3GPP has.

The base station control apparatus 30 has an IP address for communication on wireless LAN given. This IP address corresponds to the above-mentioned temporary IP address on the side of the mobile terminal 10. Further, the base station control apparatus 30 has a function of receiving the temporary IP address included in the receiving radio wave condition report (Measurement Report) signal from the mobile terminal 10.

Further, the base station control apparatus 30 has a function of receiving the above-mentioned "wireless LAN request parameter" included in the active PDP context request signal from the CN 40. The base station control apparatus 30 has a function of receiving a "threshold value" for switching to communication on wireless LAN, from the mobile terminal 10 as a part of the above-mentioned receiving radio wave condition report (Measurement Report) signal, and holding this value. As mentioned above, the threshold value may be fixedly set on the side of the base station control apparatus 30 previously instead of receiving it from the mobile terminal 10. Further alternatively, the threshold value may be previously registered in a database of the core network apparatus (CN) 40 as subscriber data, and the base station control apparatus 30 may download the same from the database.

The base station control apparatus 30 has a function of producing and managing a correspondence table among a predetermined "mobile terminal identifier (ID of MS)", "temporary IP address", "allocated radio channel (Radio Bearer)", "GTP", "context (wireless LAN request)" and "threshold value". This correspondence table is referred to as the "mobile terminal information correspondence table".

Further, the base station control apparatus 30 has a control part and a user data transfer part. The control part has a function of referring to the above-mentioned mobile terminal information correspondence table, carrying out processing described below, thereby determining which channel of a UTRAN chancel or a wireless LAN channel user data should be sent out through, and providing an instruction to the user data transfer part for the channel switching. Further, the control part in the above-mentioned base station control part has a function of sending out a signal providing an instruction to the mobile terminal 10 to turn on the power supply to the own wireless LAN device when detecting that a data amount addressed to this mobile terminal 10 having a wireless LAN communication function exceeds a predetermined threshold value. The control part has a function of sending out a signal providing an instruction to the mobile terminal 10 to turn off the power supply to the own wireless LAN device when detecting that the data amount drops from the predetermined threshold.

Further, when receiving a notification that the mobile terminal becomes able to carry out communication via wireless LAN by the receiving radio wave condition report (Measurement Report) signal from the mobile terminal 10 to which the signal for turning on the power supply to the wireless LAN device is sent, the control part in the base station control apparatus 30 sends a communication switching instruction such that user data transmission to the mobile terminal 10 will be carried out via wireless LAN, to the user data transfer part. On the other hand, if the control part in the base station control apparatus 30 has not received the notification that communication via wireless LAN becomes available when a predetermined duration has elapsed after the instruction for turning on the power supply to the wireless LAN device was sent to the mobile terminal 10, the control part in the base station control apparatus 30 determines that the mobile terminal 10 exits the wireless LAN service area S2, and transmits a signal providing an instruction to this mobile terminal 10 to turn off power supply to the wireless LAN device. Until receiving the notification of the receiving radio wave condition report (Measurement Report) signal from the mobile terminal 10 that communication via wireless LAN becomes available, the base station control apparatus 30 transmits user data to the MS 10 via the radio base station 20, i.e., via UTRAN in the conventional manner.

The above-mentioned user data transfer part in the base station control apparatus 30 has a function of terminating a GTP which is a channel from the CN 40 and a channel via UTRAN and via wireless LAN for the MS 10, and switching a transfer channel between one via UTRAN and one via wireless LAN when transferring user data received from the CN 40 based on an instruction from the control part. Further, the base station control apparatus 30 transmits/receives a control signal to/from the mobile terminal 10 via the radio base station 20 (via UTRAN) in a conventional manner, without regard to the above-mentioned user data transfer channel.

Next, a configuration of the radio base station 20 is described. The radio base station 20 has an IP communication capability via UTRAN, and has a function of sending user data and a control signal received from the mobile terminal 10 to the base station control apparatus 30 or sending user data and a control signal received from the base station control apparatus 30 to the mobile terminal 10. These functions are those which a radio control apparatus belonging to UTRAN according to the conversional 3GPP has.

A configuration of the air station 50 of wireless LAN is described next. This wireless LAN air station 50 has an interface for the base station control apparatus 30, and can repeat user data transmitted from the base station control apparatus 30 for the mobile terminal 10. In other words, the interface between the air station and the base station control apparatus 30 has a user data transfer function, and has a function as an agent for transferring user data between the mobile terminal 10 and the base station control apparatus 30. In other words, it has a conversion function between a frame format on a wired interface (Ethernet (registered trademark) or such) and a frame format on wireless communication (wireless LAN).

Further, the air station 50 is connected with the DHCP server 70, and has a function of automatically providing an IP address (corresponding to the above-mentioned temporary IP address) to the mobile station belonging thereto.

A configuration of the core network apparatus 40 may be same as the configuration of a core network apparatus in a conventional mobile communication system according to the 3GPP, where functions of subscriber management, movement management and so forth are utilizable as they are.

Figure 2:
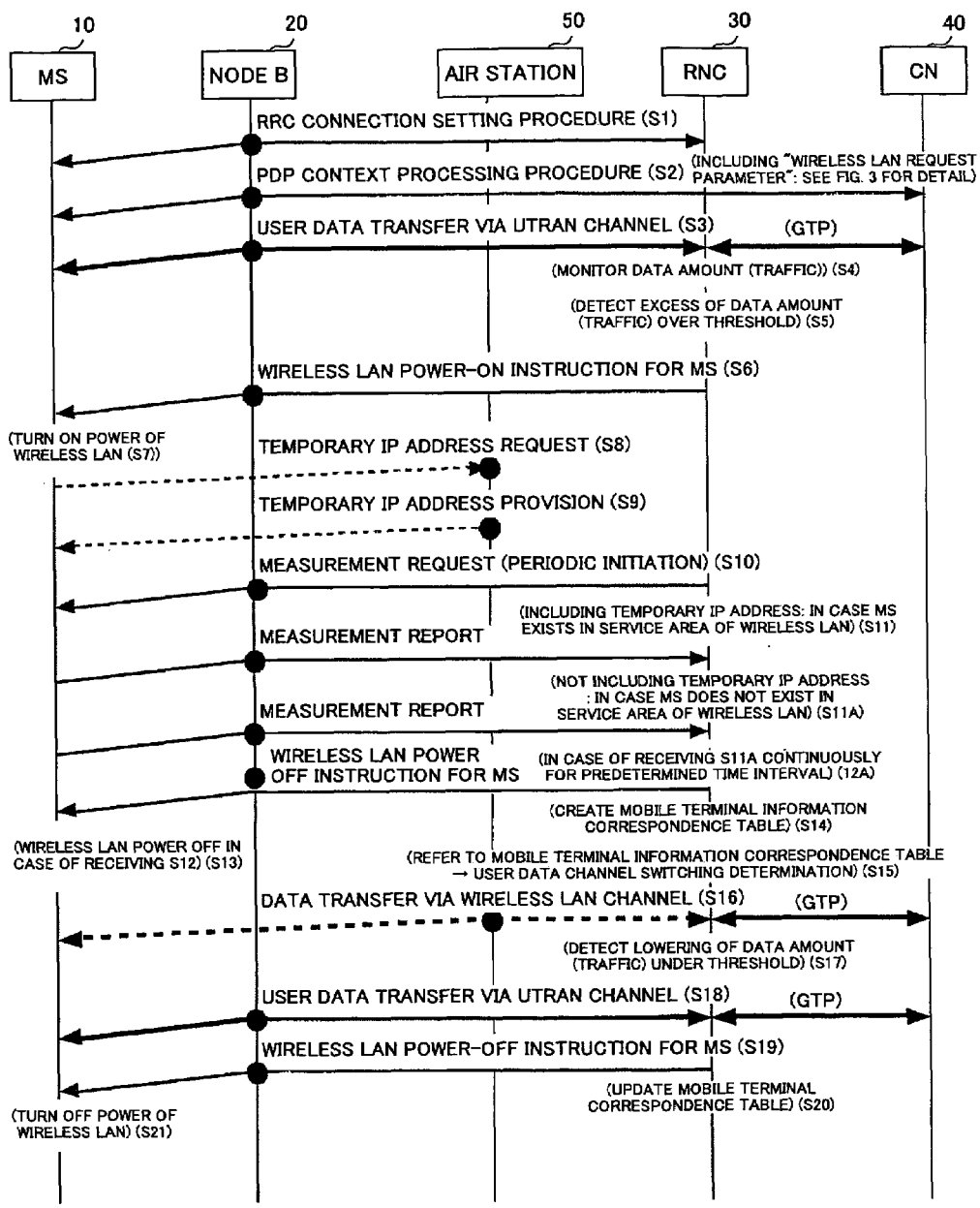
FIG. 2 shows a sequence in a wireless communication system according to a first embodiment of the present invention for establishing a user data channel, and finally the channel is changed from a UTRAN channel to a wireless LAN channel.

A communication sequence according to the present invention is described next with reference to FIGS. 2 through 8. In FIG. 2, solid lines denote flow of signal transmission via conventional UTRAN, while broken lines denote flow of signals via wireless LAN. Further, according to device names prescribed in the 3GPP, the above-mentioned mobile terminal 10, the base station control apparatus 30, the radio base station 20 and the core network apparatus 40 connected with the base station control apparatus 30 are referred to as 'MS', 'RNC', 'node B' and 'CN' (generic term), respectively.

In FIG. 2, in Step S1, when data is received by/transmitted from the MS 10, an RRC connection setting procedure for establishing a control signal channel is executed between the RNC 30 and the MS 10. It is processing defined in the European Standard of a third generation mobile communication system 'IMT2000' defined by the conventional UMTS, i.e., the European Electricity and Communication Standardization Society, and the present procedure is prescribed in the 3GPP specification, TS25.331.

Figure 3:
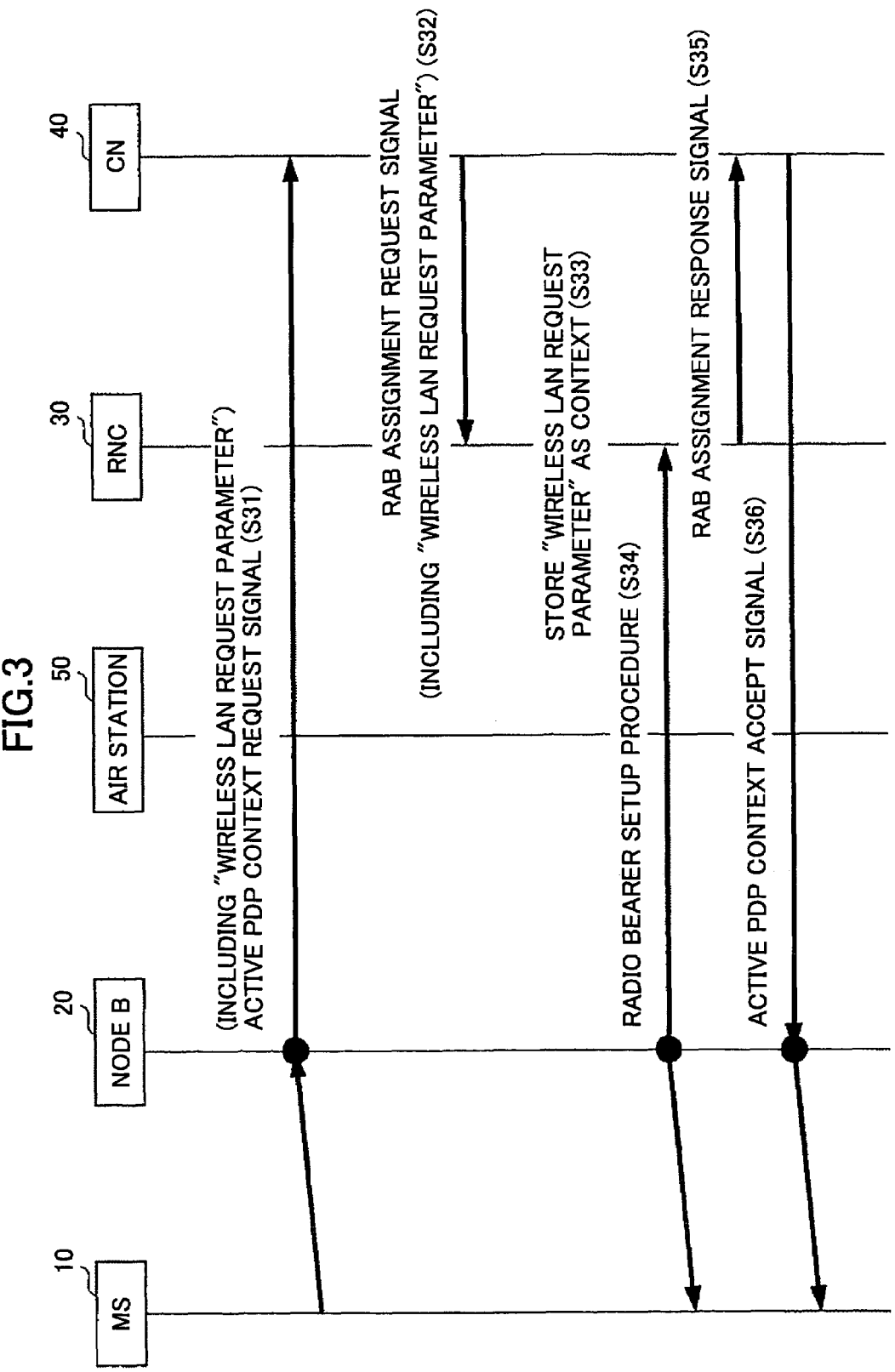
FIG. 3 shows details of a PDP context processing procedure in the sequence shown in FIG. 2, and shows a flow therein carried out until a wireless LAN request parameter reaches an RNC.
Figure 4:
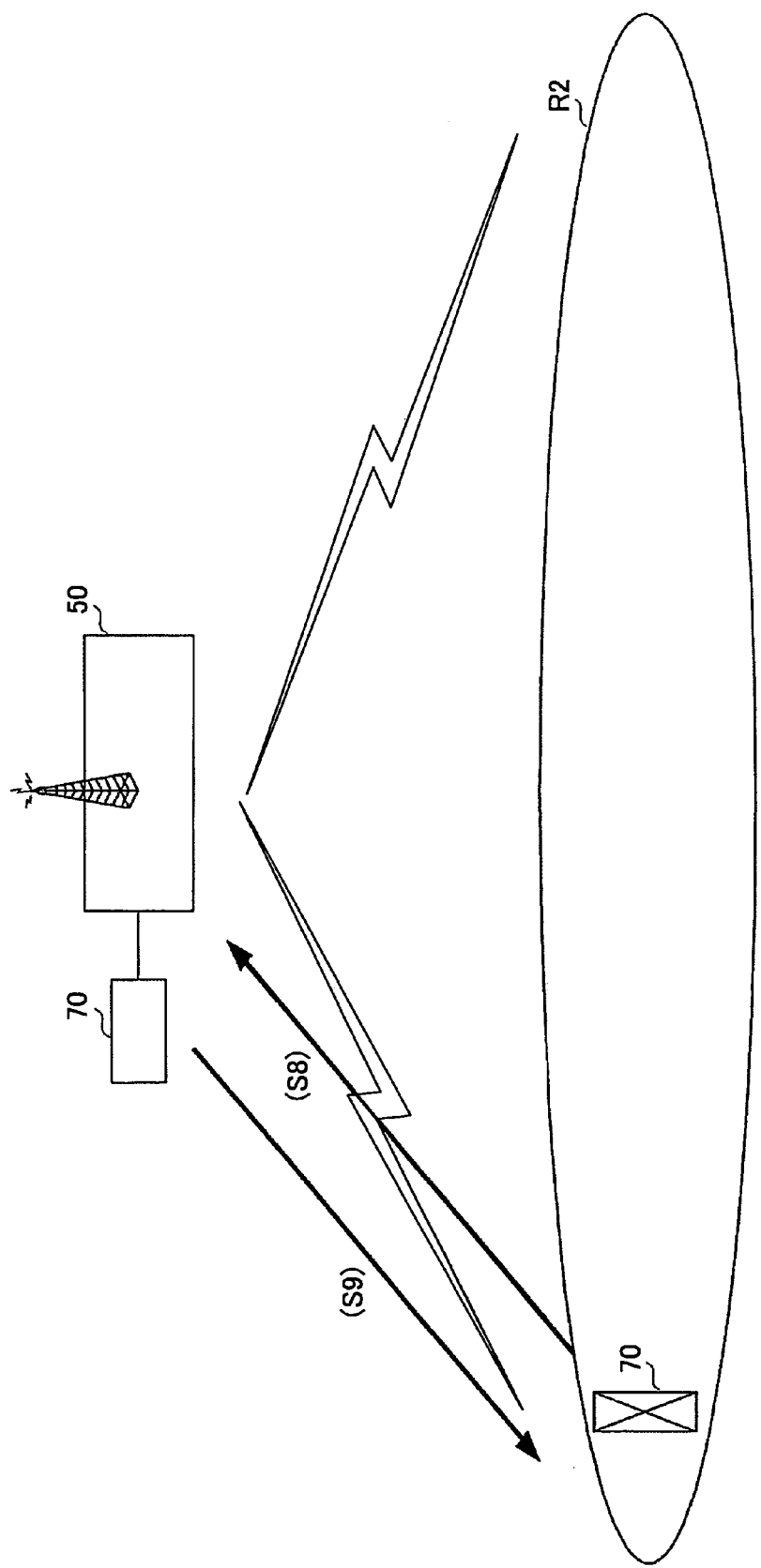
FIG. 4 illustrates creation of an IP address usable only in a wireless LAN environment for an MS with a DHCP function of a radio air station in the sequence shown in FIG. 2.
Figure 5:
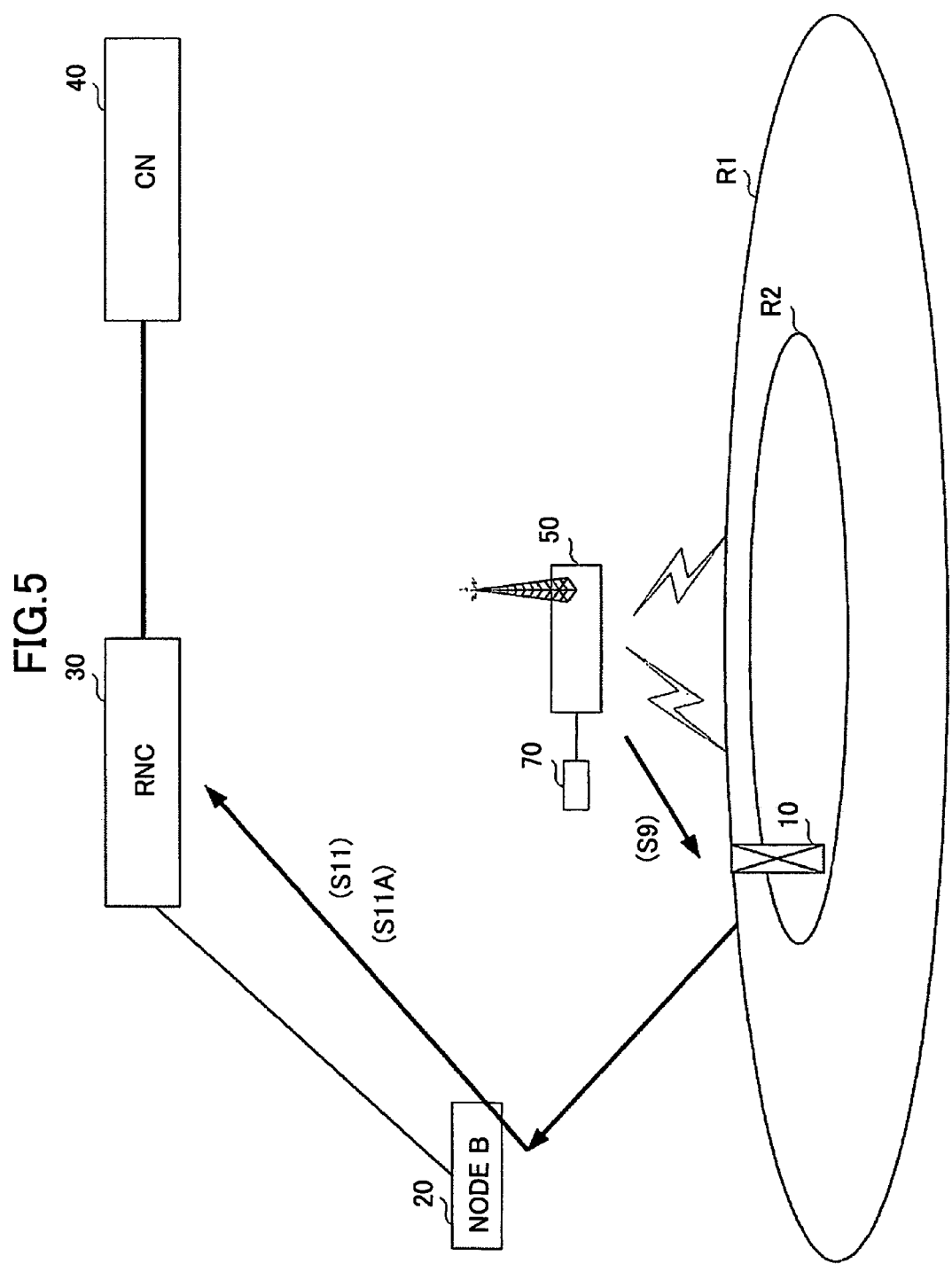
FIG. 5 illustrates "wireless LAN available" notification with the use of a conventional UTRAN channel from an MS to an RNC.

Then, in Step S2, for the purpose of setting a user data channel, a PDP context processing procedure is executed. Details of this processing procedure are shown in FIG. 3, are defined by the above-mentioned UMTS, and are prescribed in the 3GPP specification, TS23.060. According to the present embodiment, as the context information prescribed for this procedure, the above-mentioned 'wireless LAN request parameter' is newly added (Step S31 in FIG. 3). AS a result of this PDP context processing procedure being executed, a pipe called a GTP is established for the purpose of transferring user data.

As a result of the 'wireless LAN request parameter' being added as one information element of the RAB assignment request (Step S32) prescribed to be sent to the RNC 30 from the CN 40 in this processing procedure, this parameter is sent to the RNC 30, and, there, is stored as one element of the context information (Step S33). Also, as the user data channel between the RNC 30 and the MS 10, an allocated radio channel (Radio Bearer) is established (Step S34).

Then, in Step S3, the GTP and the allocated radio channel (Radio Bearer) thus established are used, and user data transmission is carried out via the conventional UTRAN (via the node B 20). AT this time, the above-mentioned user transfer part in the RNC 30 sends the user data received from the CN 40 to the UTRAN channel, whereby the user transmission to the MS 10 is achieved.

In Step S4, the RNC 30 monitors a data amount (traffic) by which the MS 10 receives. In this processing, a result of monitoring processing carried out by the RNC 30 for the purpose of switching of allocation of a channel to be used between a common channel and an individual channel according to the data amount, which processing is one according to the conventional 3GPP specification, is utilized.

Then, in Step S5, the RNC 30 determines continuously whether or not the data amount (traffic) obtained by the above-mentioned processing exceeds a predetermined threshold. This threshold may be one previously set fixedly by the RNC 30, or may be one included in the information notified of by the MS 10 to the RNC 30 via the CN in the PDP context processing procedure in Step S2.

Then, in Step S6, when the RNC 30 determines that the data amount (traffic) exceeds the threshold in Step S5, the RNC 30 provides an instruction to the MS 10 for turning on the wireless LAN device thereof via a control signal route of UTRAN (via the node B 20). Specifically, this can be achieved as a result of adding this signal to the conventional specification of the individual control channel (Dedicated Control Channel, i.e., DCCH).

In Step S7, when receiving the instruction of Step S6, the MS 10 turns on the own wireless LAN device, and receives a signal from the air station 50. Then, in Step S8, the MS 10 requests the DHCP server 70 in the air station 50 for a temporary IP address (see FIG. 4).

In Step S9, the wireless LAN air station 50 provides a temporary IP address to the MS 10. This temporary IP address is used as an IP address on the side of the MS 10 used for achieving the transport layer used when communication of user data via wireless LAN is carried out between the RNC 30 and the MS 10, and, as described above, is different from an IP address used in the end-to-end communication by the MS 10.

Then, in Step S10, the RNC 30 sends the above-mentioned receiving radio wave condition request (Measurement Request) signal to the MS 10. This is a function which is provided conventionally in an RNC according to the 3GPP, and, actually, is transmitted periodically to the MS 10.

In Step S11, the MS 10 includes the temporary IP address obtained in Step S9 in the receiving radio wave condition report (Measurement Report) signal, which is a response to the above-mentioned receiving radio wave condition request (Measurement Request) signal, and sends it to the RNC 30. As a result, the RNC 30 recognizes that the MS 10 is in a state of being able to use wireless LAN (see FIG. 5).

On the other hand, in a case where the MS 10 is outside of the wireless LAN service area R2, since it cannot receives the temporary IP address in Step S9, the MS 10 cannot add the temporary IP address to the receiving radio wave condition report (Measurement Report) signal to be returned to the RNC 30 for notifying it thereof (Step S11A).

Then, in Step S12, when the temporary IP address is not included in the receiving radio wave condition report (Measurement Report) signal received from the MS 10 until a predetermined duration has elapsed since the instruction to turn on the wireless LAN of the MS 10 was sent out, the RNC 30 determines that the MS 10 is outside of the wireless LAN service area R2, and provides an instruction to the MS 10 to turn off the power supply to the wireless LAN thereof.

Then, in Step S13, when receiving the instruction to turn off the power supply to the wireless LAN device from the RNC 30 in Step S12, the MS 10 turns off the power supply to the own wireless LAN device, and continues data reception via UTRAN.

Further, the RNC 30 produces and manages the above-mentioned mobile terminal information correspondence table (Step S14). This mobile terminal information correspondence table has a configuration, for example, as that shown in FIG. 6B, and includes "mobile terminal identifier (ID of MS)", "temporary IP address", "allocated radio channel (Radio Bearer)", "GTP", "context (wireless LAN request)", and "threshold".

In Step S15, based on the mobile terminal information correspondence table produced in Step S14, the RNC 30 determines whether or not it is necessary to switch the data transfer channel to a wireless LAN channel. Specifically, the control part in the RNC 30 determines for the relevant mobile terminal that it is necessary to switch the channel when the data communication amount for the mobile terminal for which "wireless LAN request parameter" and the "temporary IP address" are included in the mobile terminal information correspondence table exceeds the above-mentioned threshold, and provides an instruction to the user data transfer part in the RNC 30 to switch to the wireless LAN channel.

In this case, in Step S16, the data transfer part in the RNC 30 transmits user data to the temporary IP address, and thereby, the user data transmission via wireless LAN is achieved. That is, as shown in FIG. 7, the user data channel is switched to the data channel from the wireless LAN air station. Thus, as shown in FIG. 8, the user data is transferred to the relevant MS 10 on the wireless LAN channel.

On the other hand, according to the conventional 3GPP specification, when a data communication amount of an individual channel decreases, a communication channel of a relevant mobile terminal is switched automatically to a common channel. According to the present embodiment, according to this specification, the allocated radio channel (Radio Bearer) set in Step S3 is held even after the user data channel is switched to that via wireless LAN as mentioned above. A time interval is required until switching is carried out for the allocated radio channel (Radio Bearer) from the individual channel to the common channel after the communication channel was switched to the wireless LAN according to the 3GPP specification as it is. Therefore, it is preferable to provide a configuration such that, the allocated radio channel (Radio Bearer) is forcibly switched into the common channel from the individual channel immediately after the communication channel switching to the wireless LAN for the user data occurs.

Further, in Step S17, the RNC 30 continues monitoring of the data amount (traffic) started in Step 4, and determines whether or not the data amount (traffic) drops from the threshold described for Step S5. Then, in Step S18, when the RNC 30 detects that the data amount drops from the threshold, the RNC 30 returns the user data communication channel to the channel via the allocated radio channel (Radio Bearer) held in Step S16. In this case, in Step S19, at a time when the channel switching has completed in Step S18, the RNC 30 provides an instruction to the MS 10 via the control signal route of UTRAN (via the node B) to turn off the power supply to the wireless LAN device of the MS 10. Then, in this case, in Step S20, the RNC 30 updates the mobile terminal information correspondence table produced in Step S14, and deletes the value in the "temporary IP address" field. Thereby, in Step S21, the MS 10 turns off the power supply to the own wireless LAN device when receiving the instruction of Step S19.

Through the above-described operation, only when a large size of user data is received, for which a data transmission rate would be not sufficient by a conventional data transfer channel via UTRAN (via the node B), switching is made to a data transfer channel by wireless LAN, whereby user data communication is carried out. Furthermore, only when the wireless LAN is used, the power supply to the wireless LAN device of the relevant mobile terminal 10 is turned on. As a result, it is possible to effectively reduce the power consumption in the relevant terminal.

According to the present embodiment, the MS 10 receiving the control signal from the RNC 30 automatically turns on/off the power supply to the own wireless LAN device. However, instead, a configuration may be made such that the MS 10 receiving the control signal may display the information on a display device or such, thereby, the user of the MS 10 may recognize this, as a result the user may determines whether or not a communication channel should be switched, and may turn on/off the power supply to the wireless LAN device manually.

According to the present embodiment, the allocated radio channel (Radio Bearer) set in Step 3 is held even after the user data channel is switched to that via wireless LAN. However, instead, when the user data channel is switched to that via wireless LAN, the above-mentioned allocated radio channel (Radio Bearer) may be disconnected, and, when the communication via the wireless LAN has been completed, the allocated radio channel (Radio Bearer) may be set again.

Further, according to the present embodiment, the temporary IP address is given by the DHCP server accompanying the air station 50, to the mobile terminal. However, other than this, an individual DHCP server may be set in a network such as an Ethernet (registered trademark) between the air station 50 and the router 60.

Further, according to the present embodiment, in the system configuration, as shown in FIG. 1, the single air station 50 provides wireless LAN service. However, other than this, as shown in FIG. 9, a plurality of air stations 51, 52, and 53 may be used to provide the service for the area R2.

Figure 9:
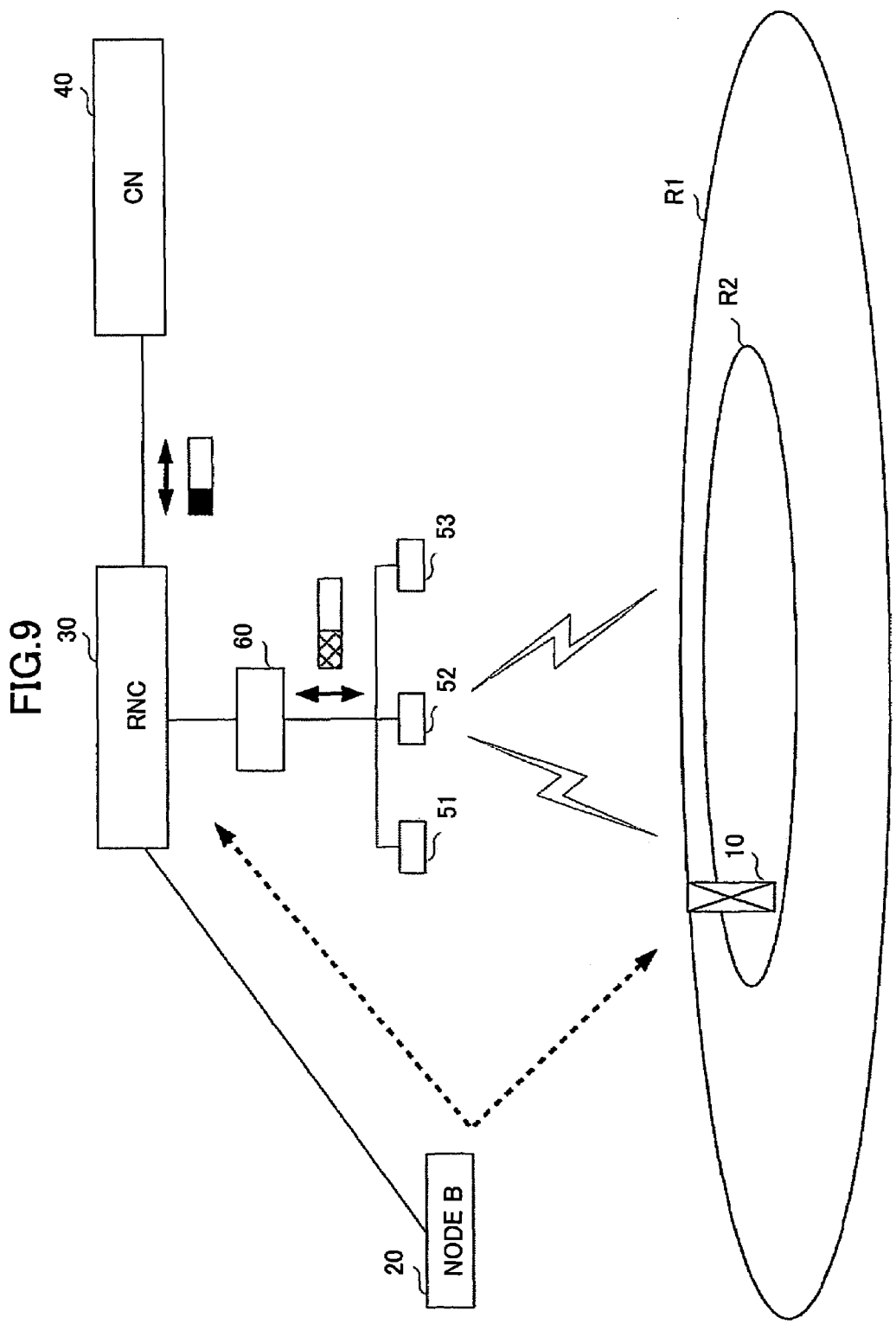
FIG. 9 is a diagram (#2) showing a system configuration example applicable to each embodiment of the present invention.

Furthermore, for a region located geographically away from the router shown in FIG. 1 or 9, segmentation may be carried out for segments, and, for each segment, a network number of an IP address may be changed, wherewith wireless LAN service may be provided thereto.

As one example of a specific method of turning on the power supply to the wireless LAN device mounted in the mobile terminal 10, a method may be considered by which a function of 'adding hardware' in a "control panel" mounted as a standard item in Windows 9x.ME or such (any one being a registered trademark) may be automatically executed, whereby the wireless LAN device may be detected, and may be started up. Further, by executing a 'hardware dismantling' function in a PC card may be executed, the power supply to the relevant wireless LAN device may be turned off.

Next, a second embodiment of the present invention is described. The second embodiment has the same configuration as that of the first embodiment. Accordingly, detailed description will be made only for parts different from those in the first embodiment. According to the present embodiment, the user who uses the mobile terminal 10 manually switches a data transfer channel between UTRAN and wireless LAN if necessary based on a data amount (traffic) displayed on the relevant mobile terminal 10. In other words, the user of the mobile terminal determines, based on the data amount to download, whether the data is to be downloaded in communication either via a channel on UTRAN or via a channel on wireless LAN, and as a result, the user carries out operation to switch the communication channel if necessary.

According to the present embodiment, the function of notifying the base station control apparatus 30 of the threshold for switching into communication with wireless LAN after attaching it to the PDP context information is not necessary. Further, a configuration is provided such that, when the user carries out a necessary operation on the mobile terminal 10 after determining to receive data via wireless LAN or finish the reception, the power supply to the wireless LAN device mounted in the mobile terminal 10 is automatically turned on/off in response to the relevant operation.

Further, when the power supply to the wireless LAN device is turned on as a result of the operation being carried out by the user, the mobile terminal 10 determines that communication via wireless LAN is available as a result of receiving radio waves from the air station 50. On the other hand, when no radio waves can be received from the air station 50, the mobile terminal 10 determines that it exists outside of the wireless LAN service area R2, notifies the user of this matter, and turns off the power supply to the own wireless LAN device.

Further, according to the present embodiment, the function of the base station control apparatus 30 to hold the threshold value when receiving the above-mentioned threshold value for switching into communication on wireless LAN in a form of being included in the receiving radio wave condition report (Measurement Report) signal is not necessary. Furthermore, the function of determining which channel between UTRAN and wireless LAN should be applied for sending out user data is not necessary.

Also, according to the present embodiment, the function of the control part of the base station control apparatus 30 of sending out the signal providing an instruction to turn on the power supply to the wireless LAN device to the mobile terminal 10 when detecting that the data amount for the mobile terminal 10 having the communication function of wireless LAN exceeds the predetermined threshold is not needed. Furthermore, the function of sending out the signal providing an instruction to turn off the power supply to the wireless LAN device to the mobile terminal when detecting that the data amount drops from the predetermined threshold is not needed.

According to the present embodiment, the base station control apparatus 30 has a function of providing an instruction to the user data transfer part for switching a communication channel for carrying out transmission of user data to the mobile terminal 10 via wireless LAN, when receiving from the mobile terminal 10 a notice that communication via wireless LAN is available in a form of being included in the receiving radio wave condition report (Measurement Report) signal.

Figure 10:
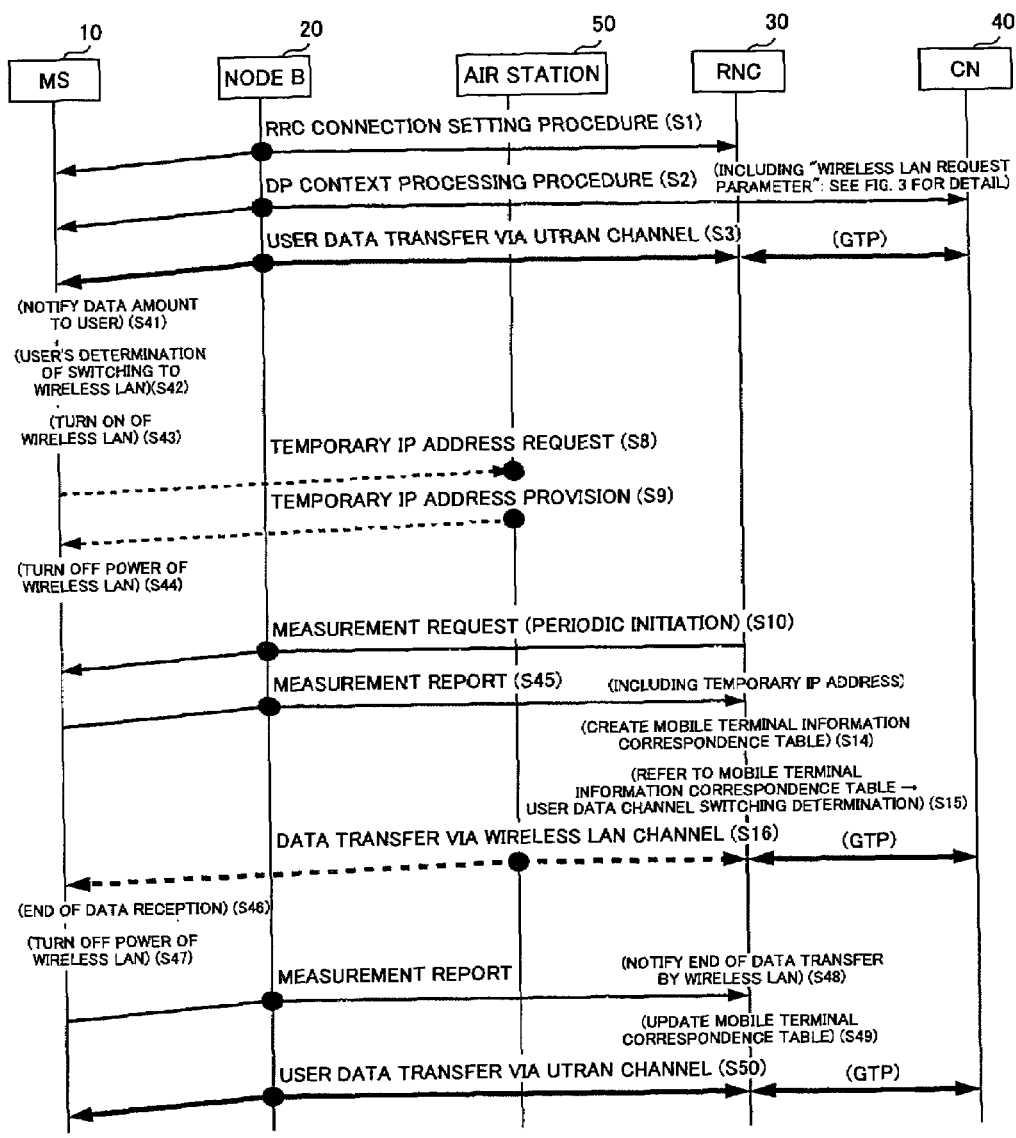
FIG. 10 shows a sequence in a wireless communication system according to a second embodiment of the present invention for establishing a user data channel, and finally the channel is changed from a UTRAN channel to a wireless LAN channel.

A communication sequence of the second embodiment is described with reference to FIG. 10.

First, the same as in the first embodiment, in Step S1, when data is received by/transmitted from the MS 10, the RRC connection setting procedure for establishing a control signal channel is executed between the RNC 30 and the MS 10. Then, in Step S2, for the purpose of setting a user data channel, the PDP context processing procedure is executed. As the context information prescribed, the 'wireless LAN request parameter' is newly added, and as a result of this PDP context processing procedure being executed, a pipe called a GTP is established for the purpose of transferring user data between the RNC 3 and the CN 40. As one information element of the RAB assignment request sent from the CN 40 to the RNC 30 in this processing procedure, the "wireless LAN request parameter" is added, and thereby, this parameter information is stored as one information element of the context information in the RNC 30, and also, the allocated radio channel (Radio Bearer) as a user data channel between the RNC 30 and the MC 10 is established.

With the use of the thus-established GTP and the allocated radio channel (Radio Bearer), user data communication on a conventional UTRAN channel (via the node B) is carried out. At this time, the data transfer part in the RNC 30 sends the user data received from the CN 40 to the UTRAN channel, and data transmission to the MS 10 is achieved.

At this time, the user of the mobile terminal 10 can access an FTP server, and as a result, in Step S41, the MS 10 displays a size of data which the user wishes to download thanks to a common function such as a Web browser or such. In Step S42, the user determines whether or not a data communication channel should be switched to wireless LAN for this purpose, based on the data amount to download, displayed on the MS 10. Then, when the user determines to switch the communication channel, the user carries out the operation for switching on the MS 10.

In response to this operation, the MS 10 turns on the power supply to the wireless LAN device as mentioned above in Step S43, and therewith receives radio waves from the air station 50.

Then, in Step S8, the same as in the first embodiment, the MS 10 requests the DHCP server 70 of the air station 50 for a temporary IP address. The air station 50 responds thereto, and provides a temporary IP address to the MS 10 in Step S9.

Then, when the MS 10 cannot receive a temporary IP address even after a predetermined duration has elapsed since the temporary IP address request was made in Step S8, it determines that it exists outside of the wireless LAN service area R2. As a result, in Step S44, the MS 10 notifies the user that it exists outside of the wireless LAN service area R2, turns off the power supply to the own wireless LAN device, and continues data reception on the UTRAN channel set in Step S3.

Further, the same as in the first embodiment, in Step S10, the RNC 30 sends the receiving radio wave condition request (Measurement Request) signal to the MS 10 periodically. In Step S45, the MS 10 transmits the temporary IP address obtained in the above-mentioned step to the RNC 30 after including it in a propagation condition report (Measurement Report) signal which is a response to the receiving radio wave condition request signal. As a result, the RNC 30 recognizes that the MS 10 is in an environment to be able to use wireless LAN.

Then, in Step S14, the same as in the first embodiment, the RNC 30 produces and manages the mobile terminal information correspondence table. In this mobile terminal information correspondence table, respective information of 'mobile terminal identifier (MS's ID)', 'temporary IP address', 'allocated radio channel (Radio Bearer)', 'GTP', 'context (wireless LAN request)' and 'threshold value' are included. In Step S15, when the 'radio request parameter' and the 'temporary IP address' are included in the thus-produced 'mobile terminal information correspondence table', the RNC 30 determines that it is necessary to switch into wireless LAN for data transmission to the relevant mobile terminal 10. Specifically, when receiving the 'temporary IP address' from the mobile terminal 10 for which the 'wireless LAN parameter' is included, the control part in the RNC 30 provides an instruction to the user data transfer part in the RNC 30 to switch to a wireless LAN channel.

In Step S16, the user data transfer part in the RNC 30 transmits user data for the temporary IP address, and thereby, achieves the user data transmission via wireless LAN. Through the above-mentioned procedure, the user data is transferred to the MS 10 via wireless LAN.

Then the user can know that downloading of the data is finished by means of a conventional FTP function for data downloading (Step S46). Then, when the user thus recognizes that the downloading is finished, the user determines to finish data reception via wireless LAN, and carries out operation to turn off the power supply to the wireless LAN device of the MS 10 (Step S47).

When detecting the turning off of the power supply to the wireless LAN device, the MS 10 transmits the above-mentioned receiving radio wave condition report (Measurement Report) signal in which blank is inserted to the field of the temporary IP address to the RNC 30, and thereby, notifies it of the finish of data transfer via wireless LAN (Step S48).

When receiving this receiving radio wave condition report (Measurement Report) signal, the RNC 30 inserts blank in the field of the temporary IP address of the mobile terminal information correspondence table (Step S49). Thus the RNC 30 recognizes that the MS 10 exits the environment of being able to use wireless LAN, and switches for user data communication into the conventional UTRAN channel (via the node B) (Step S50), set in Step S2.

Through this procedure, it is possible to obtain the effect same as that in the first embodiment. Turning off the power supply to the wireless LAN in Step S47 may be carried out after the detection of switching of user data communication into the conventional UTRAN channel (via the node B) in Step S50.

Further, in the present embodiment, the user recognizes a user data amount, and determines for switching of communication into a wireless LAN channel. However, other than this, a user data amount monitoring part may be provided in the mobile terminal 10, the mobile terminal 10 itself may detect that the data reception/transmission amount exceeds or drops from a predetermined threshold value, and may automatically carry out the switching between a mobile communication network channel and a wireless LAN channel.

Furthermore, the same as in the first embodiment, as shown in FIG. 9, other than the configuration of FIG. 1, the plurality of air stations may be provided, and therewith, a service may be provide to one area. Further, for a geographically separate region, segmentation may be carried out in the router 60 in FIG. 1 or FIG. 9, and, an IP address network number may be changed for each segment, wherewith wireless LAN service may be provided thereto.

For each of the above-mentioned first and second embodiments, description has been made for a case where the mobile terminal 10 receives data. However, the present invention may be applied in the same manner also for a case where, conversely, data is transmitted from the mobile terminal 10 to the RNC 30.

Further, for each embodiment, description has been made for a method of reducing power consumption by means of turning on/off of the power supply to the entirety of the wireless LAN device provided in the mobile terminal 10. However, a similar advantage may be obtained also when a configuration is made such that only a partial functional part such as a radio wave transmission functional part, a MAC address analysis part or such in the wireless LAN device may be activated/deactivated, i.e., may be fed or may not be fed with the power.

Figure 11:
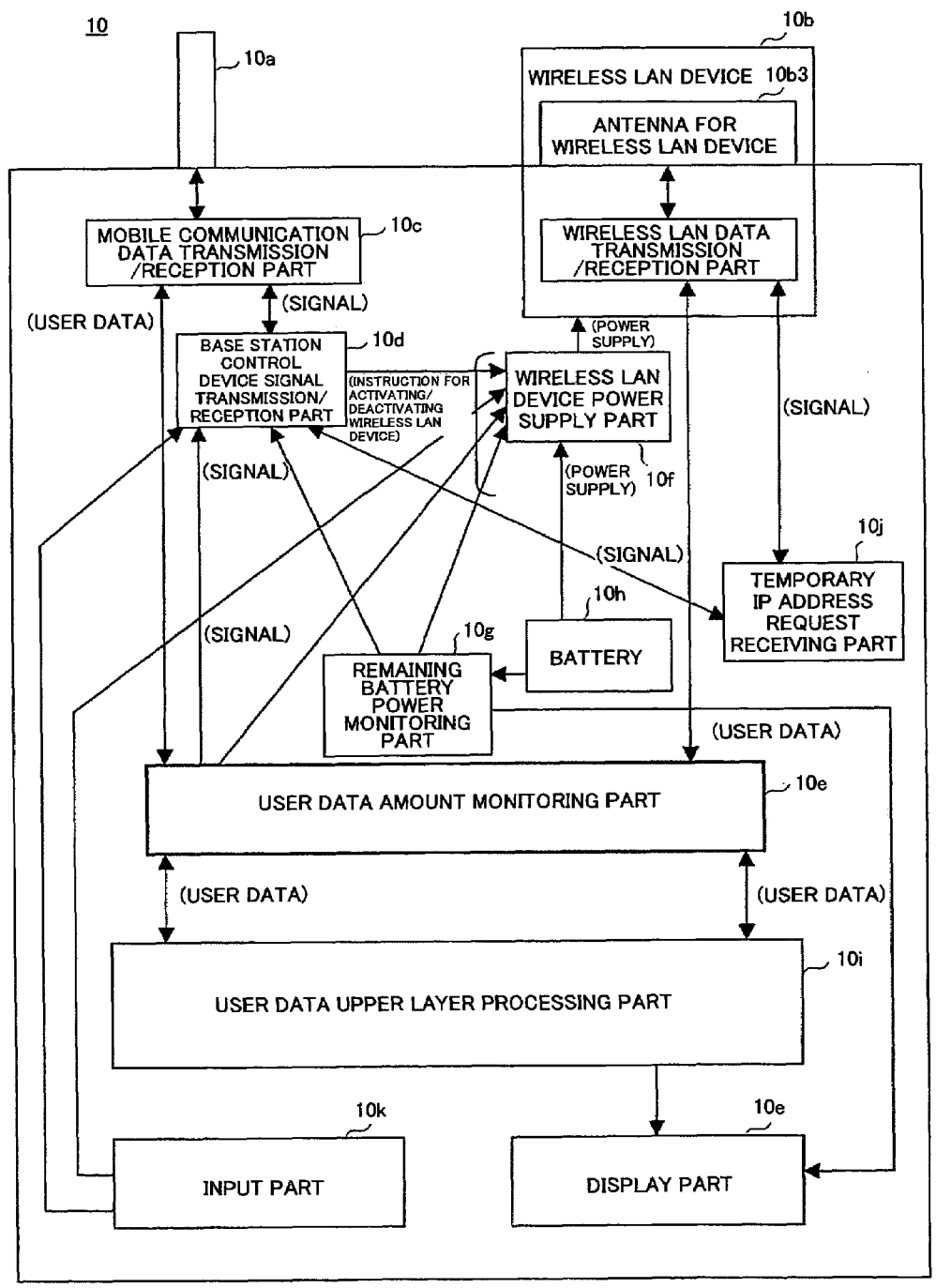
FIG. 11 shows a functional block diagram of a mobile terminal applicable to each embodiment of the present invention.
Figure 12:
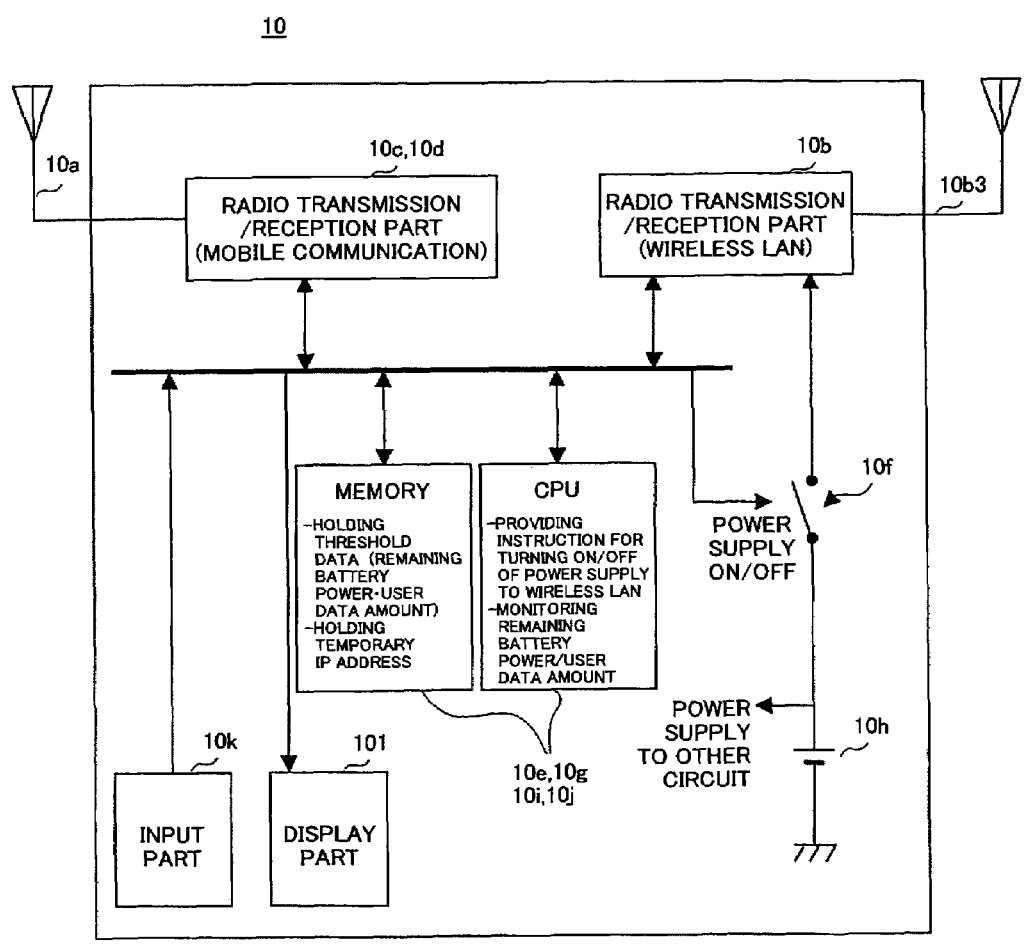
FIG. 12 shows a hardware configuration of a mobile terminal applicable to each embodiment of the present invention.

Next, a configuration of the mobile terminal 10 for each embodiment is described. FIG. 11 shows a functional block diagram of the mobile terminal 10 and FIG. 12 shows a hardware configuration of the same. As shown in FIG. 12, the mobile terminal 10 includes radio transmission/reception parts 10c and 10d having original radio transmission/reception functions of the mobile communication, i.e., the communication functions via UTRAN; and a radio transmission/reception part 10b having new wireless LAN radio transmission/reception functions, i.e., the wireless LAN device 10b. Further, the mobile terminal 10 includes an input part 10k including pressing buttons or such for enabling the user of the mobile terminal 10 to carry out input operation; and a display part 101 such as a liquid crystal display device or such for providing display to the user. Further, for the respective transmission/reception parts 10c, 10d and 10b, antennas 10a and 10b3 are provided.

Furthermore, the mobile terminal 10 includes a CPU and a memory for totally carrying out various sorts of operation and control including the above-described communication sequence operation, and carries out functions of functional blocks 10e, 10g, 10i and 10j described below. Further, the mobile terminal 10 includes a battery 10h for supplying operation power to the mobile terminal 10, and a power supply part 10f for turning on/off the power supply from the battery 10f to the wireless LAN device 10b.

With reference to FIG. 11, details of specific functions of the mobile terminal 10 are described next. In the case of the above-mentioned first embodiment, since the base station control apparatus 30 determines for switching of a user data communication channel, a user data amount monitoring part 10e and a remaining battery power monitoring part 10g are not necessary in the mobile terminal 10 in this case.

The mobile terminal 10 carries out communication of a normal signal and user data such as Web contents via the conventional mobile communication network, i.e., via UTRAN.

Then, according to the above-mentioned first embodiment, when the base station control apparatus 30 detects that a data communication amount for the mobile terminal 10 exceeds the predetermined threshold value, it provides an instruction to the mobile terminal 10 for activating the wireless LAN device 10b, and carrying out communication via a wireless LAN channel. The mobile terminal 10 receives this signal in the base station control apparatus transmission/reception part 10d via the data transmission/reception part 10c for the conventional mobile communication network. When receiving the above-mentioned signal in the base station control apparatus transmission/reception part 10d, this part 10d drives the wireless LAN power supply part 10f, and causes it to carry out power supply to the wireless LAN device 10h from the battery 10h.

Further, in parallel to the above-mentioned operation, the base station control apparatus transmission/reception part 10d notifies a temporary IP address request and reception part 10j that the power supply is made to the wireless LAN device 10b. When receiving it, the temporary IP address request and reception part 10j carries out request for and reception of the above-mentioned temporary IP address from the air station 50 via the wireless LAN device 10b. Furthermore, the temporary IP address request and reception part 10j notifies the base station control apparatus transmission/reception part 10d of the temporary IP address thus received from the air station 50. This transmission/reception part 10d includes this temporary IP address in the above-mentioned receiving radio wave condition report (Measurement Report) signal, and transmits it to the base station control apparatus 30. As a result, the mobile terminal device 10 becomes able to carry out communication via wireless LAN.

When the base station control apparatus 30 detects that the data communication amount for the mobile terminal 10 drops from the predetermined threshold value, it provides an instruction in a signal to the mobile terminal 10 for deactivating the wireless LAN device 10b, and switching the communication into a mobile communication network channel (via UTRAN). The mobile terminal 10 receives this instruction signal in the base station control apparatus transmission/reception part 10d via the conventional mobile communication network data transmission/reception part 10c. When receiving the above-mentioned signal in the base station control apparatus transmission/reception part 10d, this part 10d drives the wireless LAN power supply part 10f, and causes it to stop the power supply from the battery 10h to the wireless LAN device 10h.

In the above-mentioned configuration, in the mobile terminal device 10, operation can be achieved such that, the power is supplied to the wireless LAN device 10b only when user data communication is carried out via wireless LAN according to an instruction from the base station control apparatus 30, and thus, the power consumption in the mobile terminal 10 can be reduced.

Operation of the mobile terminal 10 corresponding to the above-mentioned second embodiment is described below. However, in this case, since user communication channel switching operation is carried out by the user of the mobile terminal 10, the remaining battery power monitoring part 10g is not necessary in FIG. 11.

In a case where a file is downloaded with the use of FTP or such in a state in which communication of a signal and user data is carried out via a mobile communication network channel (via UTRAN), a data amount of this file is displayed in a page of a Web browser displayed on the display part 101, and the user sees it so that the user may determine whether or not this data should be downloaded after switching is made for a wireless LAN channel.

When the user determines that switching is made for a wireless LAN channel as a result, the user provides an instruction to this terminal 10 for switching for a wireless LAN channel by operating the input part 10k. By this input operation, the wireless LAN power supply part 10f is driven, the power supply from the battery 10h to the wireless LAN device 10b is started, and, in the same procedure as in the case of the first embodiment, the mobile terminal device 10 enters a condition of being able to carry out communication via wireless LAN.

Further, in a case of downloading by FTP, since completion of the data reception is displayed on the display part 101 and thus the user is notified thereof, the user who has seen it operates the input part 10k and requests the base station control apparatus 30 for carrying out communication by a mobile communication network channel, via the base station control apparatus transmission/reception part 10d and the mobile communication transmission/reception part 10c.

Simultaneously, the wireless LAN device power supply part 10f is driven from the operation of the user made on the input part 10k, and thus, the power supply to the wireless LAN device 10b from the buttery 10h is stopped. Alternatively, simultaneously the user data amount monitoring part 10e may detect the completion of the data reception from decrease in the data receiving amount, may drive the wireless LAN device power supply part 10f so as to automatically stop the power supply from the buttery 10h to the wireless LAN device 10b.

As a result, a configuration can be provided such that the mobile terminal device 10 can carry out the power supply to the wireless LAN device 10b only when user data communication is carried out via a wireless LAN channel, and thus, it is possible to effectively reduce the power consumption in the mobile terminal 10.

A third embodiment which is a variant embodiment of the second embodiment is described below. In the present embodiment, different from the second embodiment, a user data amount is monitored by a function of the mobile terminal 10 itself, and, as a result, the mobile terminal 10 automatically starts up the above-mentioned channel switching. Also in this case, the remaining battery power monitoring part 10g is not necessarily required.

First, in a state in which the mobile terminal 10 carries out communication of a signal and user data via a mobile communication network communication channel, when the user data amount monitoring part 10e detects that a data communication amount on the mobile communication network communication channel exceeds a predetermined threshold value, the user data amount monitoring part 10e provides an instruction to the base station control apparatus 30 via the base station control apparatus transmission/reception part 10d and the mobile communication network transmission/reception part 10c for switching the communication into a wireless LAN channel.

Further, in parallel to the above-mentioned processing, the user data amount monitoring part 10e drives the wireless LAN device power supply part 10f so as to cause it to start power supply to the wireless LAN device 10b, and also, in the same procedure as that in the first embodiment, the mobile terminal 10 is made to enter a state of being able to carry out communication via wireless LAN.

Further, when the user data amount monitoring part 10e detects that the data communication amount on the wireless LAN channel drops from the predetermined threshold value, the user data amount monitoring part 10e provides an instruction to the base station control apparatus 30 via the base station control apparatus transmission/reception part 10d and the mobile communication network transmission/reception part 10c for switching the communication back to a mobile communication network communication channel. In parallel to the above-mentioned processing, the user data amount monitoring part 10e drives the wireless LAN device power supply part 10f so as to cause it to stop the power supply to the wireless LAN device 10b.

As a result, the same as in the above-mentioned other embodiments, the mobile terminal device 10 can carry out power supply to the wireless LAN device 10b only when user data communication is carried out via a wireless LAN channel, and thus, it is possible to effectively reduce the power consumption in the mobile terminal 10.

A fourth embodiment of the present invention is described below. According to the present embodiment, when a remaining battery power drops from a threshold in the mobile terminal 10 which carries out communication via a wireless LAN channel, switching is made for the communication into a mobile communication network communication channel.

In this case, in a state in which communication of a control signal is carried out via a mobile communication network communication channel, and user data communication is carried out via a wireless LAN channel, when the remaining battery power monitoring part 10g in the mobile terminal 10 detects that the remaining power of the battery 10h drops from a predetermined threshold, it provides an instruction to the base station control apparatus 30 via the base station control apparatus transmission/reception part 10d and the mobile communication network transmission/reception part 10c for switching the user data transfer into a mobile communication network communication channel. The base station control apparatus 30, receiving this instruction to carry out the transfer via a mobile communication network communication channel, carries out the switching of the communication channel. When completing the channel switching, the base station control apparatus 30 provides an instruction in a signal to the mobile terminal 10 to deactivate the wireless LAN device 10b and carry out the communication via a mobile communication network communication channel.

The mobile terminal 10 receives this signal in the base station control apparatus transmission/reception part 10d via the mobile communication network transmission/reception part 10c, and as a result, it drives the wireless LAN device power supply part 10f and causes it to stop the power supply from the battery 10h to the wireless LAN device 10b.

As a result, the mobile terminal 10 stops the communication via a wireless LAN channel when the remaining battery power is little, and thereby, it is possible to prevent interruption of communication processing such as downloading or such due to battery shutoff from occurring.

Figure 13:
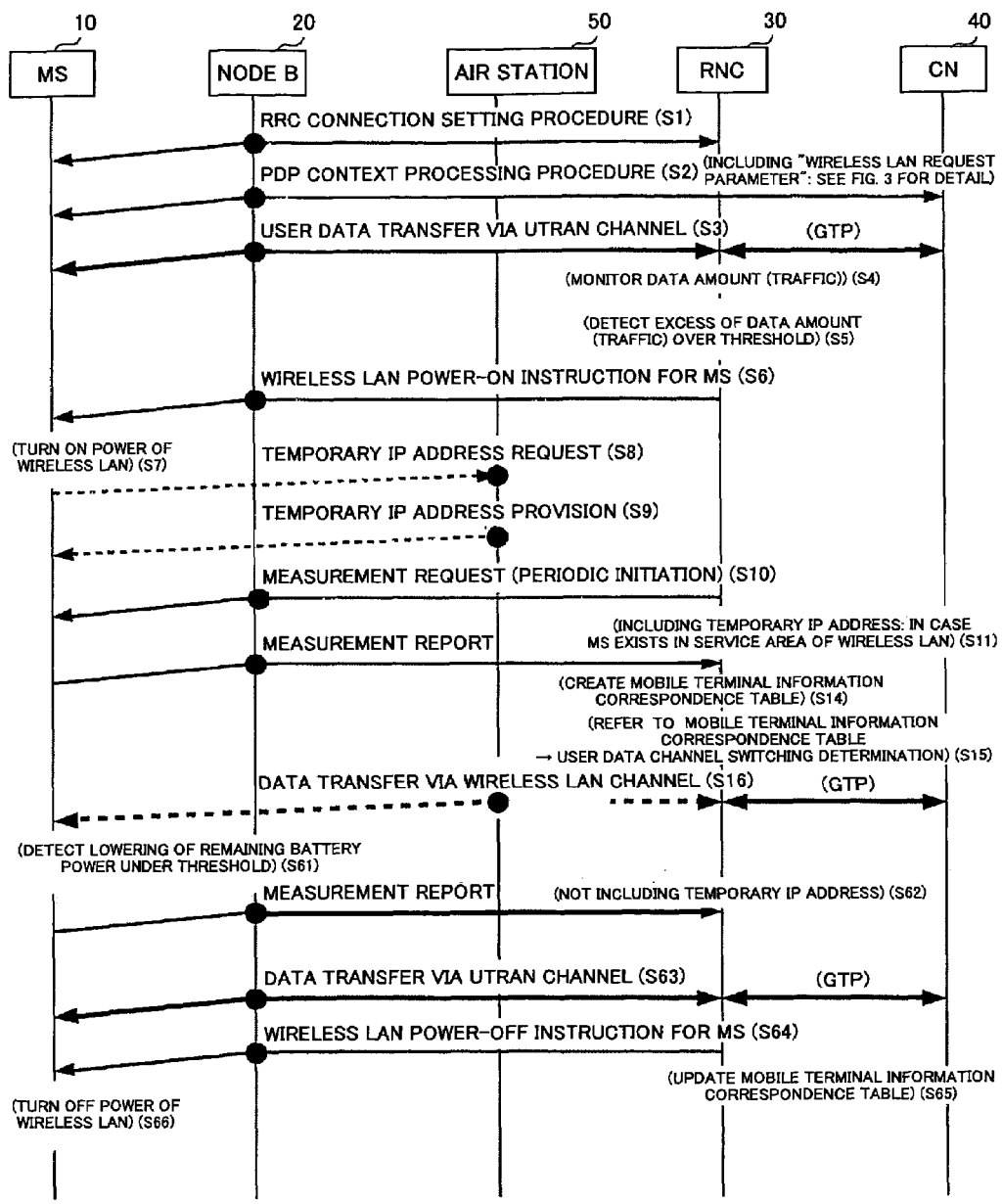
FIG. 13 shows a sequence in a wireless communication system according to a fourth embodiment of the present invention for establishing a user data channel and a flow of subsequent processing.

FIG. 13 shows a communication sequence according to the fourth embodiment. In this case, procedure of Steps S1 through S16 is same as that in the first embodiment. However, in the present embodiment, since the sequence shows switching procedure from a state in which communication via a wireless LAN channel is carried out, processing of Steps S11A, S12 and S13 is not included.

Following to Step S16, in Step S61, when the MS 10 detects that its own remaining battery power drops from the predetermined threshold, it transmits the radio wave condition report (Measurement Report) signal in a form of not including an temporary IP address to the RNC 30 in Step S62, and thereby, it notifies that it cannot continue the communication via wireless LAN.

When receiving this signal, the RNC 30 switches the user data communication channel to the allocated radio channel (Radio Bearer) held in Step S16 in Step S63. At a time the RNC completes this channel switching, the RNC 30 provides an instruction to the MS 10 via a control signal route of UTRAN (via the node B) for turning off the power supply to the wireless LAN device 10b in Step S64. Furthermore, the RNC 30 updates the mobile terminal management table produced in Step S14, and deletes the 'temporary IP address' (Step S65). Then, when receiving the instruction of Step S64, the MS 10 turns off the power supply to the wireless LAN device 10b (Step S66).

By this procedure, switching from a wireless LAN channel to a mobile communication network communication channel is automatically carried out when the remaining battery power drops.

A fifth embodiment of the present invention is described next. In this embodiment, in a state in which the mobile terminal 10 which can carry out communication via a wireless LAN channel carries out communication of user data via a mobile communication network channel (the state of Step S3 in the sequence of the first embodiment), when it detects that the own remaining battery power drops from a threshold, it does not carry out processing of turning on the power supply to the wireless LAN device 10b even when receiving an instruction to turn on the power supply to the wireless LAN device 10b from the RNC 30 (Step S6 in the sequence of the first embodiment), but continues the user data transfer on the mobile communication network channel.

In other words, in this case, in a state in which the mobile terminal 10 carries out control signal communication on the mobile communication network communication channel and also carries out user data communication on the mobile communication network communication channel, when the remaining battery power monitoring part 10g in the mobile terminal 10 detects that the remaining power of the battery 10h drops from a predetermined threshold value, it provides an instruction in a signal to the wireless LAN device power supply part 10f not to start the power supply even if it receives a 'wireless LAN device power turning on instruction' from the base station control apparatus 30.

As a result, when the remaining battery power is little, the mobile terminal device 10 does not switch from a mobile communication network communication channel to a wireless LAN channel. Thereby, interruption of communication due to battery shutoff during wireless LAN communication is prevented.

Figure 14:
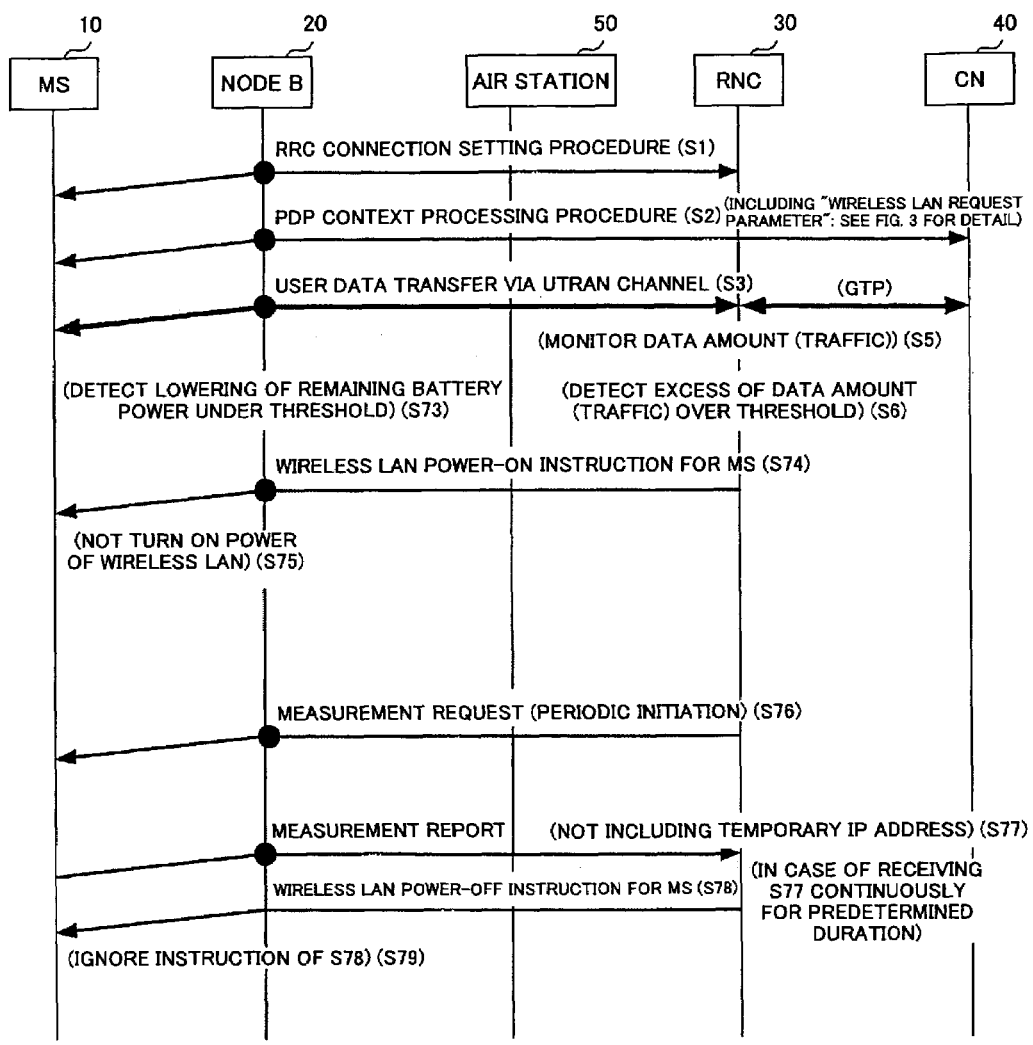
FIG. 14 shows a sequence in a wireless communication system according to a fifth embodiment of the present invention for establishing a user data channel and a flow of subsequent processing.

With reference to FIG. 14, a communication sequence of the fifth embodiment is described next. In this case, a procedure of Steps S1 through S5 is same as the procedure in the first embodiment described with reference to FIG. 2. Following to Step S5, when the RNC 30 detects that a data amount (traffic) exceeds a threshold value in Step S6 after the MS 10 detects that its own remaining battery power drops from a threshold value in Step S73, the RNC 30 provides an instruction to the MS 10 in a control signal route of a UTRAN channel (via the node B) the same as in the first embodiment for turning on the power supply to the wireless LAN device 10b (Step S74). However, in this case, the MS 10 does not turn on the power supply to the own wireless LAN device 10b (Step S75). As a result, it cannot receive radio waves from the air station 50. Accordingly, it cannot obtain a temporary IP address in Steps S8 and S9 in the sequence of the first embodiment.

Then, the same as in the first embodiment, in Step S76, the RNC 30 transmits the receiving radio wave condition request (Meaw4emetn Request) signal to the MS 10. At this time, since the MS 10 could not obtain a temporary IP address as mentioned above, the MS 10 cannot notify the RNC 30 of a temporary IP address by the receiving radio wave condition report (Measurement Report) signal (Step S77). As a result, the RNC 30 have not been able to receive the receiving radio wave condition report (Measurement Report) signal including a temporary IP address even after a predetermined duration has elapsed since it provided the instruction to the MS 10 for turning on the power supply to the wireless LAN device 10b to the MS 10. Therefore, the RNC 30 determines that power supply to the wireless LAN device 10b is not turned on in the MS 10, and then, provides an instruction to the MS 10 to turn off the power supply to the wireless LAN device 10b (Step S78). In such a case, it is determined in the first embodiment that the MS 10 exists outside of the service area R2. However, for the mobile communication network, the MS which exists outside of the service area R2 and the MS in which the power supply to the wireless LAN device 10b is not turned on are regarded as identical. Further, in this case, since the MS 10 has the power supply to the wireless LAN device 10b left turned off, it ignores the off instruction in Step S78 from the RNC 30 (Step S79).

By this procedure, the user data transfer on the mobile communication network communication channel is continued.

Thus, according to the present embodiment, even when the user moves into the wireless LAN service area, it is not necessary to use wireless LAN, but the user can select appropriate one of a communication channel by mobile communication network UTRAN and a communication channel by wireless LAN, based on information as to whether or not data transmission/reception is carried out, the data amount, the remaining battery power, as to how much part the radio link band of mobile communication network or wireless LAN is left usable, or a combination thereof. Accordingly, since the wireless LAN device is activated only when it is used in the mobile terminal, it is possible to effectively reduce the power consumption amount in the mobile terminal. As a result, a working duration of the mobile terminal by the battery increases, and thereby, it is possible to provide an environment in which the convenience is improved, while a high speed IP communication service can be enjoyed as is necessary.

The present invention can be applied not only to the above-mentioned respective embodiments, but also other various embodiments/variant embodiments may be contrived therefrom as long as they conform to the basic idea of the present invention.

The invention claimed is:

1. A communication method enabling communication on a predetermined mobile communication network and communication on a predetermined wireless communication network different from the predetermined mobile communication network, comprising the steps of:

switching, for predetermined packet communication, between the communication on the predetermined mobile communication network and the communication on the predetermined wireless communication network, and activating or deactivating a part concerning the predetermined wireless communication included in a mobile terminal, wherein the switching is made only for user data, and a control signal is transmitted always via the predetermined mobile communication network;

monitoring a data communication amount of the mobile terminal, which corresponds to a transmission/reception data flow rate per a unit time; and carrying out the switching between the communication on the predetermined mobile communication network and the communication on the predetermined wireless communication network when the data communication amount exceeds a predetermined threshold as a result of the monitoring.

2. The communication method as claimed in claim 1, wherein:

based on a radio link band usage condition, said switching between the communication on the predetermined mobile communication network and the communication on the predetermined wireless communication network is carried out.

3. The communication method as claimed in claim 1, wherein:

said monitoring step and said step of switching the communication path between the predetermined mobile communication network and the predetermined wireless communication network resulting from the monitoring are carried out by a control part which carries out communication control of said predetermined mobile communication network.

4. The communication method of claim 1, wherein:

said monitoring step is carried out by the mobile terminal; and the mobile terminal determines, for the switching, the communication channel as a result of monitoring, and provides an instruction for the switching to a control part which carries out communication control of the predetermined mobile communication network.

5. The communication method as claimed in claim 1, further comprising the step of:

operating by a user of the mobile terminal, to said mobile terminal, for the switching between the communication on the predetermined mobile communication network and the communication on the predetermined wireless communication network.

6. The communication method as claimed in claim 1, further comprising the steps of:

monitoring a remaining battery power of the mobile terminal; and carrying out switching into the communication on the predetermined mobile communication network when the remaining battery power falls below a predetermined threshold as a result of the monitoring during the communication using the predetermined wireless communication network.

7. The communication method as claimed in claim 1, further comprising the steps of:

monitoring a remaining battery power of the mobile terminal; and when the remaining battery power falls from a predetermined threshold as a result of the minitoring, the activating of the part concerning the predetermined wireless communication network is not carried out by the mobile terminal.

8. The communication mathod as claimedd in claim 1, wherein:

when the mobile terminal provides an instruction to switch into the communication on the predetermined mobile communication network, the part concerning the communication on the predetermined wireless communication network is deactivated.

9. The communication method as claimed in claim 1, wherein:

when it is determined that the mobile terminal does not carry out the communication on the predetermined wireless communication network, the part concerning the communication on the predetermined wireless communication network is deactivated.

10. The communication method as claimed in claim 1, comprising the step of:

deactivating the part concerning the communication on the predetermined wireless communication network when switching into the communication on the wireless communication network could not be carried out after an elapse of a predetermined time since the part concerning the communication on the wireless communication network included in the mobile terminal was activated.

11. The communication method as claimed in claim 1, comprising the steps of:

sending, via the mobile communication network, an instruction to activate a function of the mobile terminal concerning the communication on the wireless communication network;

the mobile terminal requesting via the predetermined wireless communication network for an address, and the address being then obtained by said mobile terminal via the predetermined wireless communication network in response thereto; and confirming that the mobile terminal is in an environment such that communication on the predetermined wireless communication network is available when said address is included in a report from said mobile terminal.

12. The communication method as claimed in claim 1, comprising the steps of:

activating, in response to a user's operation, a function of the mobile terminal concerning the communication on the wireless communication network;

the mobile terminal requesting via the predetermined wireless communication network an address, and the address being then obtained by said mobile terminal via the predetermined wireless communication network in response thereto; and confirming that the mobile terminal is in an environment such that communication on the predetermined wireless communication network is available when said address is includedee in a report from said mobile terminal.

13. A communication apparatus in a mobile terminal carrying out communication on a predetermined mobile communication network and communication on a predetermined wireless communication network different from the predetermined mobile communication network, comprising:

a part responding to switching, for predetermined packet communication, between the communicatinn on the predetermined mobile communication network and the communication on the predetermined wireless communication network, to activate or deactivate a part concerning the communication on the predetermined wireless communication network, wherein the switching is made only for user data, and a control signal is transmitted always via the predetermined mobile communication network;

a part monitoring a data communication amount of the mobile terminal, which corresponds to a transmission/reception data flow rate per unit time; and a part requesting switching from the communication on the predetermined mobile communication network to the communication on the predetermined threshold in said monitoring part.

14. The communication apparatus as claimed in claim 13, furthet comprising:

a part monitoring a remaining battery power; and a part requesting switching into the communication on the predetermined mobile communication network when the remaining battery power falls below a predetermined threshold as a result of the monitoring during the communication on the predetermined wireless communication network.

15. The communication apparatus as claimed in claim 13, wherein:

said part carrying out activation or deactivation of the part concerning the communication on the predetermined wireless communication network deactivates the part concerning the communication on the predetermined wireless communication network when it is determined that said communication apparatus does not carry out the communication on the predetermined wireless communication network.

16. The communication apparatus as claimed in claim 13, wherein:

when a remaining battery power falls below a predetermined threshold as a result of monitoring during the communication on the predetermined wireless communication network, the activation of the part concerning the communication on the predetermined wireless communication network is not carried out even when an instruction to activate said part concerning the communication on the predetermined wireless communication network is received.

17. The communication apparatus as claimed in claim 13, wherein:

a display device is provided to display that an instruction to activate or deactivate the part concerning the communication on the predetermined wireless communication network has been received, and, the activating or deactivating is carried out in response to a corresponding operation made by a user.

18. The communication apparatus as claimed in claim 13, comprising:

a part deactivating the part concerning the communication on the predetermined wireless communication network when switching into the communication on the wireless communication network could not be carried out after an elapse of a predetermined time since the part concerning the communication on the wireless communication network included in the mobile terminal was activated.

19. A communication system for carrying out, with a mobile terminal, communication on a predetermined mobile communication network and communication on a predetermined wireless communication network different from the predetermined mobile communication network, comprising:

a part switching, for carrying out predetermined packet communication, between the communication on the predetermined mobile communication network and the communication on the predetermined wireless communication network;

a part providing an instruction to avtivate or deactivate a part included in the mobile terminal concerning the communication on the predetermined wireless communication network, wherein the switching is made only for user data, and a control signal is transmitted always via the predetermined mobile communication network;

a part monitoring a data communication amount of the mobile terminal, which corresponds to a transmission/reception data flow rate per unit time; and a part carrying out the switching between the communication on the predetermined mobile communication network and the communication on the predetermined wireless communication network when the data communication amount exceeds a predetermined threshold as a result of the monitoring.

20. The communication system as claimed in claim 19, comprising:

a part switching between the communication on the predetermined mobile communication network and the communication on the predetermined wireless communication network based on a radio link band usage condition.

21. The communication system as claimed in claim 19, wherein:

a control part carrying out communication control of the predetermined mobile communication network has said part carrying out the switching as a result of the monitoring.

22. The communication system as claimed in claim 19, wherein:

the mobile terminal has said monitoring part; and the mobile terminal determines, as a result of the monitoring, as to whether or not the switching between the communication on the predetermined mobile communication network and the communication on the predetermined wireless communication network should be carried out, and sends a corresponding switching request signal to a control part carrying out communication control of the predetermined mobile communication network.

23. The communication system as claimed claim 19, wherein:

the switching between the communication on the predetermined mobile communication network and the communication on the predetermined wireless communication network is achieved as a result of a corresponding switching request signal being sent to a control part carrying out communication control of the predetermined mobile communication network when a user operates the mobile terminal.

24. The communication system as claimed in claim 19, wherein:

the mobile terminal has a part monitoring a remaining battery power of the mobile terminal; and a corresponding switching request signal for switching into the communication on the predetermined mobile communication network is sent from the mobile terminal to a control part carrying out communication control of the predetermined mobile communication network when the remaining battery power falls below a predetermined wireless communication network.

25. The communication system as claimed in claim 19, comprising:

a part, when a report that the communication on the predetermined wireless communication network is not possible is received from the mobile terminal, sending an instruction to deactivate the part of the mobile terminal concerning the communication on the predetermined wireless communication network.

26. The communication system as claimed in claim 19, comprising:

a part sending an instruction to deactivate the part concerning the communication on the predetermined wireless communication network when switching into the communication on the wireless communication network could not be carried out after an elapse of a predetermined time since a signal requesting activation of the part concerning the communication on the wireless communication network included in the mobile terminal was sent.

* * * * *